United States Patent
Zhang et al.

(10) Patent No.: US 10,531,493 B2
(45) Date of Patent: Jan. 7, 2020

(54) LOW LATENCY CONTENTION BASED SCHEDULING REQUEST

(71) Applicant: INTEL IP CORPORATION, Santa Clara, CA (US)

(72) Inventors: Yushu Zhang, Beijing (CN); Yuan Zhu, Beijing (CN); Wenting Chang, Beijing (CN); Gang Xiong, Portland, OR (US); Qinghua Li, San Ramon, CA (US); Huaning Niu, San Jose, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/560,471

(22) PCT Filed: Dec. 22, 2015

(86) PCT No.: PCT/US2015/067510
§ 371 (c)(1),
(2) Date: Sep. 21, 2017

(87) PCT Pub. No.: WO2016/171767
PCT Pub. Date: Oct. 27, 2016

(65) Prior Publication Data
US 2018/0063869 A1 Mar. 1, 2018

Related U.S. Application Data

(60) Provisional application No. 62/151,281, filed on Apr. 22, 2015.

(30) Foreign Application Priority Data

May 21, 2015 (WO) ................ PCT/CN2015/079497

(51) Int. Cl.
*H04W 74/08* (2009.01)
*H04W 72/12* (2009.01)
*H04W 74/00* (2009.01)

(52) U.S. Cl.
CPC ....... *H04W 74/0833* (2013.01); *H04W 72/12* (2013.01); *H04W 74/004* (2013.01)

(58) Field of Classification Search
CPC ......... H04W 74/0042; H04W 74/0833; H04W 72/12
See application file for complete search history.

(56) References Cited

U.S. PATENT DOCUMENTS 10,111,224 B2 * 10/2018 Lee ................... H04W 72/0453
2008/0233941 A1 9/2008 Jen

OTHER PUBLICATIONS

Ericsson, Huawei; SI: Study on Latency reduction techniques for LTE; 3GPP TS RAN Meeting #67, RP-150465; Mar. 9-12, 2015; Shanghai, China.

(Continued)

*Primary Examiner* — Kevin C. Harper
*Assistant Examiner* — Henry Baron
(74) *Attorney, Agent, or Firm* — Thorpe North & Western

(57) ABSTRACT

Technology for decreasing latency for contention based scheduling request (SR) is disclosed. A user equipment (UE) can randomly select a physical random access channel (PRACH) preamble index for a PRACH transmission. The UE can multiplex the PRACH preamble index together with a SR message containing a cell radio network temporary identifier (C-RNTI) and a buffer status report (BSR) for the PRACH transmission. The UE can process, for transmission, to an enhanced node B (eNB), the PRACH preamble index multiplexed with the SR message in a subframe #(n) of the PRACH transmission, wherein n is a subframe number.

30 Claims, 16 Drawing Sheets

Alternative Low Latency PRACH based SR Transmission

(56) References Cited

OTHER PUBLICATIONS

3GPP TS 36.212 V12.2.0; Evolved Universal Terrestrial Radio Access (E-UTRA); Multiplexing and channel coding (Release 12) (Sep. 2014).
3GPP TS 36.321 V12.5.0; Evolved Universal Terrestrial Radio Access (E-UTRA); Medium Access Control (MAC) protocol specification (Release 12) (Mar. 2015).

* cited by examiner

500

| R | TA Command |
| TA Command | UL Grant |
| UL Grant ||
| UL Grant ||
| C-RNTI ||
| C-RNTI ||

602 → | CP | SEQ | RES |
←─────── K TTI ───────→

604 → | CP | SEQ | CP | data |
├──────── PRACH ────────┤── Msg ──┤

| PRACH Format | CP [Ts] | SEQ [Ts] | Table 1 Reserve [Ts] | Available OFDM symbol for data | duration [sf] |
|---|---|---|---|---|---|
| 0 | 3168 | 24576 | 2976 | 1 | 1 |
| 1 | 21024 | 24576 | 15840 | 7 | 2 |
| 2 | 6240 | 49152 | 6048 | 2 | 2 |
| 3 | 21024 | 49152 | 21984 | 10 | 3 |

FIG. 7

A) SR message transmission with 15Kz subcarrier spacing

B) SR message transmission with 1.25Kz subcarrier spacing

1200

| | |
|---|---|
| Oct 1 | MAC Head |
| Oct 2 | MAC Head |
| Oct 3 | C-RNTI |
| Oct 4 | C-RNTI |
| Oct 5 | LCID \| Buffer Size |

A) Short BSR Structure

| | | |
|---|---|---|
| Oct 1 | MAC Head | |
| Oct 2 | MAC Head | |
| Oct 3 | C-RNTI | |
| Oct 4 | C-RNTI | |
| Oct 5 | Buffer Size 0 | Buffer Size 1 |
| Oct 6 | Buffer Size 1 | Buffer Size 2 |
| Oct 7 | Buffer Size 2 | Buffer Size 3 |

B) Long BSR Structure

| | |
|---|---|
| Oct 1 | C-RNTI |
| Oct 2 | C-RNTI |
| Oct 3 | LCID \| Buffer Size |

C) Short BSR Structure without head

| | | |
|---|---|---|
| Oct 1 | C-RNTI | |
| Oct 2 | C-RNTI | |
| Oct 3 | Buffer Size 0 | Buffer Size 1 |
| Oct 4 | Buffer Size 1 | Buffer Size 2 |
| Oct 5 | Buffer Size 2 | Buffer Size 3 |

D) Long BSR Structure without head

FIG. 12

LOW LATENCY CONTENTION BASED SCHEDULING REQUEST

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In 3GPP LTE, an uplink can be established using a physical random access channel (PRACH). Data can be transmitted from the eNB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

In a 3GPP LTE system, a UE needs to transmit a scheduling request (SR) to acquire resources for its uplink transmission. Currently, there are two ways for the SR transmission. One way is by using the PUCCH in a configured subframe. Alternatively, a contention based procedure via PRACH can be used to send the SR. However, transmitting the SR using current methods via the PUCCH or PRACH can have relatively large delays. These delays can increase the latency of the communication system.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5 illustrates a random access response (RAR) pattern in accordance with an example;

FIG. 6 illustrates a physical random access channel (PRACH) transmission signal in accordance with an example;

FIG. 7 illustrates a table of low latency physical random access channel (PRACH) scheduling request (SR) transmission structure formats in accordance with an example;

FIG. 12 illustrates payload structures of low latency physical random access channel (PRACH) scheduling request (SR) transmission structure in accordance with an example;

Figure 1:
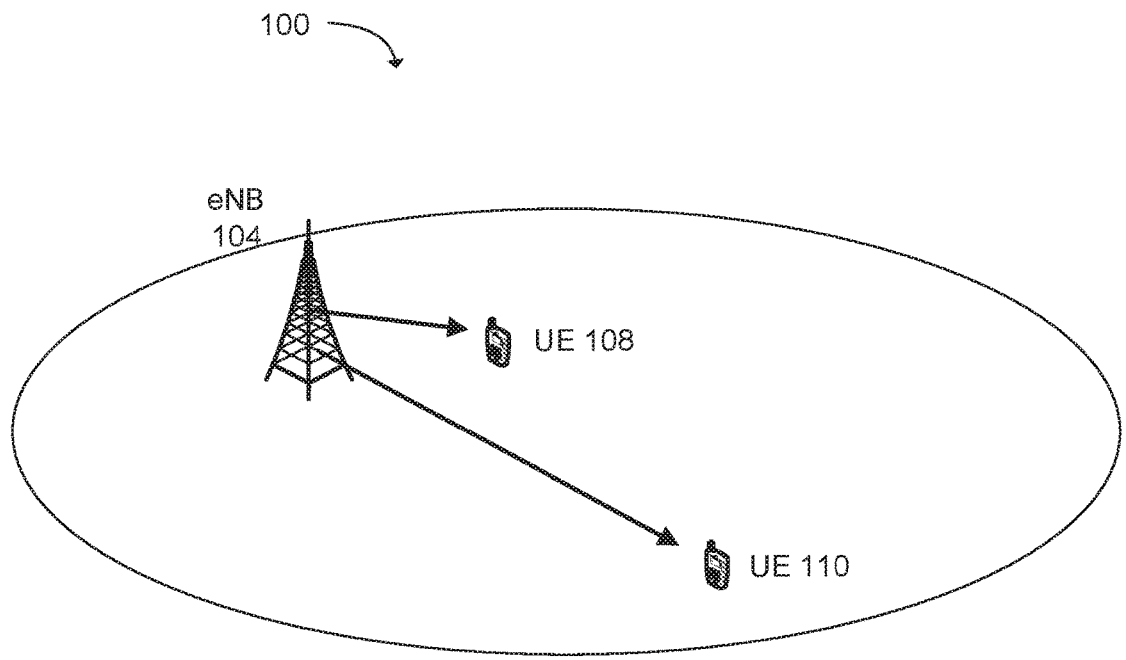
FIG. 1 illustrates an LTE operation zone within a cell having an evolved node B (eNB) with two devices in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one aspect, 3GPP radio access network (RAN) LTE system can include an evolved universal terrestrial radio access network (E-UTRAN), which can include a plurality of evolved Node-Bs (eNBs) and communicates with a plurality of mobile stations, also referred as user equipment (UEs). The radio protocol stacks of E-UTRAN are given including a radio resource control layer (RRC), a packet data convergence protocol layer (PDCP), a radio link control layer (RLC), a media access control layer (MAC), and a physical layer (PHY).

In order to utilize shared channel (SCH) resources, when sharing resources between UEs, a MAC in an eNB can dynamically assign downlink shared channel (DL-SCH) or uplink shared channel (UL-SCH) resources by physical downlink control channel (PDCCH) signaling. In one example, the PDCCH can include a cell radio network temporary identifier (C-RNTI) or other type of identifier to allocate physical layer resources depending on traffic volume, quality of service (QoS) requirements of each UE, and associated radio bearers.

A scheduling request (SR) can be used by a UE for requesting UL resources. The SR can be triggered when the UE does not have any UL resource allocated for the current transmission time interval (TTI). The TTI is the duration of a transmission on a radio link. In one example, a 3GPP LTE Rel. 12 TTI can comprise a single OFDMA subframe, with a duration of 1 millisecond (ms). A User Equipment (UE) can transmit the scheduling request (SR) to acquire UL resources for the UL transmission. The UE can transmit the SR transmission by 1) a physical uplink control channel (PUCCH) in a configured subframe or 2) a physical random access channel (PRACH) in a contention based communication. However, both the PUCCH transmission and the PRACH transmission are subject to relatively large delays. For example, the 3GPP LTE Rel. 12 procedures for sending SR via the PUCCH or PRACH can take up to 20 subframes (i.e. 20 ms).

The PRACH can be used to carry random access preambles user for initiation of a random access procedure. For example, the random access preamble can include a cyclic prefix (CP), a sequence (SEQ), and a guard time (GT). The PRACH can occupy 6 physical resource block (PRBs) in the frequency domain and spans 1, 2 or 3 subframes in the time domain, depending on the specific preamble format. In the frequency domain, several subcarriers at both ends of the 6 PRBs are not used to avoid interference with the adjacent PUCCH/PUSCH. In the time domain, the cyclic prefix (CP) and guard time (GT) can be used to avoid interference with the previous and next subframes. As it turns out, the GT determines the maximum cell radius.

Furthermore, to enhance the performance of UEs near the cell edge (e.g., cell-edge users), a maximum coding rate for PRACH format 0, which can equal 80/144=0.56 (e.g., a coding rate of 0.56) with a long BSR message carried by 1 OFDM symbol within 6 Resource Blocks (RBs), can be reduced. Since the frequency resource can be limited, one way to reduce the coding rate is by compressing message bits. Thus, the SR message bits can be compressed from 80 bits into 40 bits (or 24 bits with a new Cyclic Redundancy Check (CRC) sequence). Then the maximum coding rate can be reduced to 0.28 and/or lower allow for the receiving performance to be significantly enhanced.

Thus, the present technology is provided to support mission critical Machine Type Communication (MTC) in existing LTE systems and 5G wireless technology systems to provide increased efficiency and reliability for connectivity with a guaranteed low latency and availability and reliability-of-service. Accordingly, in one aspect, the present technology provides a solution for contention based scheduling request (SR) for low latency applications. In particular, the technology provides for low latency-contention based SR messages based on PRACH transmission. In one aspect, a PRACH preamble and SR message can be multiplexed together and transmitted in the PRACH message transmission.

In one aspect, a technology is provided for decreasing latency for contention based scheduling request (SR). A user equipment (UE) can randomly select a physical random access channel (PRACH) preamble index for a PRACH transmission. The UE can multiplex the PRACH preamble index together with a SR message containing a cell radio network temporary identifier (C-RNTI) and a buffer status report (BSR) for the PRACH transmission. The UE can process, for transmission, to an enhanced node B (eNB), the PRACH preamble index multiplexed with the SR message in a subframe #(n) of the PRACH transmission, wherein n is a subframe number.

In an additional aspect, a technology is provided for decreasing latency for contention based scheduling request (SR). An eNodeB can receive, from a user equipment (UE), a physical random access channel (PRACH) transmission having a randomly selected PRACH preamble index multiplexed with a scheduling request (SR) message containing a cell radio network temporary identifier (C-RNTI) and a buffer status report (BSR) in a subframe #(n) of the PRACH transmission, wherein n is a subframe number.

In yet an additional aspect, a technology is provided for decreasing latency for a contention based scheduling request (SR). A user equipment (UE) can calculate a scramble cyclic redundancy code (CRC) sequence according to a cell radio network temporary identifier (C-RNTI), a cell identification (ID), and a subframe #(n) for a physical random access channel (PRACH) transmission, wherein n is a subframe number. The UE can determine a current buffer size and a buffer size index (BSI). The UE can calculate a PRACH preamble index using the BSI and the scrambled CRC sequence for generating a scheduling request (SR) message.

FIG. 1 illustrates an LTE operation zone within a cell 100 having an evolved node B (eNB) with two devices. FIG. 1 illustrates an eNB 104 that can be associated with an anchor cell, macro cell or primary cell. Also, the cell 100 can include User equipment (UE or UEs) 108, 110 that are in communication with the eNB 104.

The eNB 104 can be a high transmission power eNB, such as a macro eNB, for coverage and connectivity. The eNB 104 can be responsible for mobility and can also be responsible for radio resource control (RRC) signaling and other types of control signaling. User equipment (UE or UEs) 108, 110 can be supported by the macro eNB 104.

Figure 2:
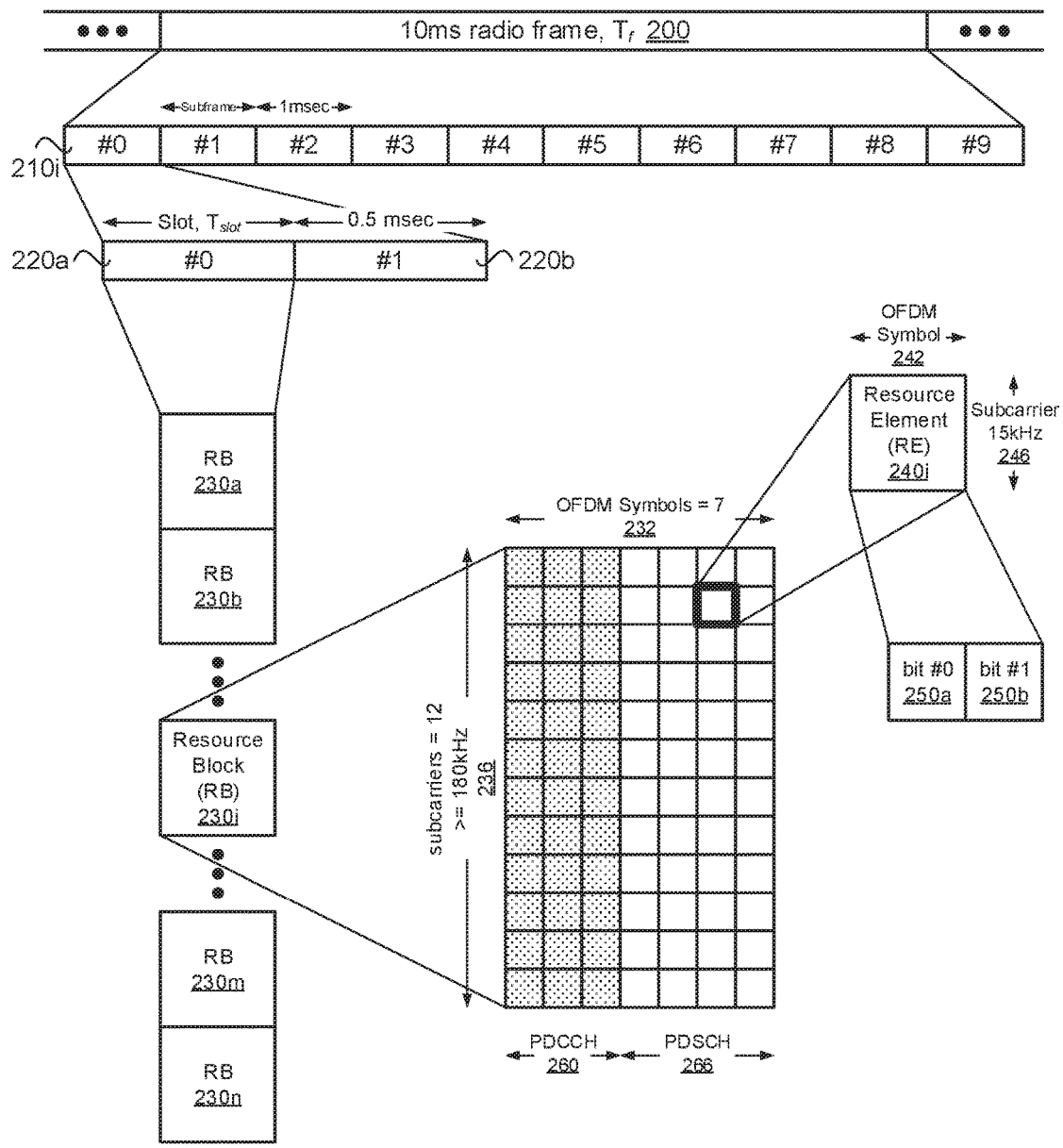
FIG. 2 illustrates a diagram of radio frame resources (e.g., a resource grid) for a downlink (DL) transmission including a legacy physical downlink control channel (PDCCH) in accordance with an example.

FIG. 2 illustrates a diagram of radio frame resources (e.g., a resource grid) for a downlink (DL) transmission including a legacy physical downlink control channel (PDCCH) in accordance with an example. In the example, a radio frame 200 of a signal used to transmit the data can be configured to have a duration, Tf, of 10 milliseconds (ms). Each radio frame can be segmented or divided into ten subframes 210i that are each 1 ms long. Each subframe can be further subdivided into two slots 220a and 220b, each with a duration, Tslot, of 0.5 ms. The first slot (#0) 220a can include a legacy physical downlink control channel (PDCCH) 260 and/or a physical downlink shared channel (PDSCH) 266, and the second slot (#1) 220b can include data transmitted using the PDSCH. In one aspect, at least part of the architectural design of the radio frame 200 can also be applicable for a single carrier frequency division multiple access (SC-FDMA) in an uplink (UL) transmission.

Each slot for a component carrier (CC) used by the node and the wireless device can include multiple resource blocks (RBs) 230a, 230b, 230i, 230m, and 230n based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or physical RB (PRB), when a legacy PDCCH is used. The remaining 11 to 13 OFDM symbols (or 14 OFDM symbols, when legacy PDCCH is not used) in the subframe can be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

In one example embodiment, each RB (physical RB or PRB) 230i can include 12 subcarriers 236 with a bandwidth of 15 kHz per subcarrier (on the frequency axis) and 6 or 7 orthogonal frequency-division multiplexing (OFDM) symbols 232 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 240i using short or normal cyclic prefixing, or the resource block can be mapped to 72 REs (not shown) using extended cyclic prefixing. The RE can be a unit of one OFDM symbol 242 by one subcarrier (i.e., 15 kHz) 246.

Each RE can transmit two bits 250a and 250b of information in the case of quadrature phase-shift keying (QPSK) modulation. Other types of modulation can be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNB to the UE, or the RB can be configured for an uplink transmission from the UE to the eNB.

The example of FIG. 2 is not intended to be limiting. Rather, it is just one example of an OFDMA radio frame structure. Future 5G systems may have a different number of subcarriers and OFDM symbols that can be used to construct the OFDMA subframe 210i and radio frame 200. Each OFDM symbol 232 may have a different time, and each subcarrier may have a different frequency bandwidth. A shorter subframe can enable a communication scheme with lower latency.

As previously stated, a UE can transmit the SR transmission by 1) a physical uplink control channel (PUCCH) in a configured subframe or 2) a physical random access channel (PRACH). However, both the PUCCH transmission and the PRACH transmission can be subject to large or long time delays. For example, using a PUCCH, a UE can be configured to wait for the UE's configured SR transmission subframe in order to send an SR using the PUCCH. The UE can be configured to wait until the UE's uplink grant arrives in order to send a buffer status report (BSR). Then the UE can wait for receiving the uplink grant in order to transmit a first uplink data transmission. In addition, using a PUCCH for issuing a SR may not be applicable for all UEs since an eNB may not configure a setup operation for an SR configuration for each UE due to resource limitation. Alternatively, using a PRACH for issuing an SR can also have a large delay as illustrated in FIG. 3.

Figure 3:
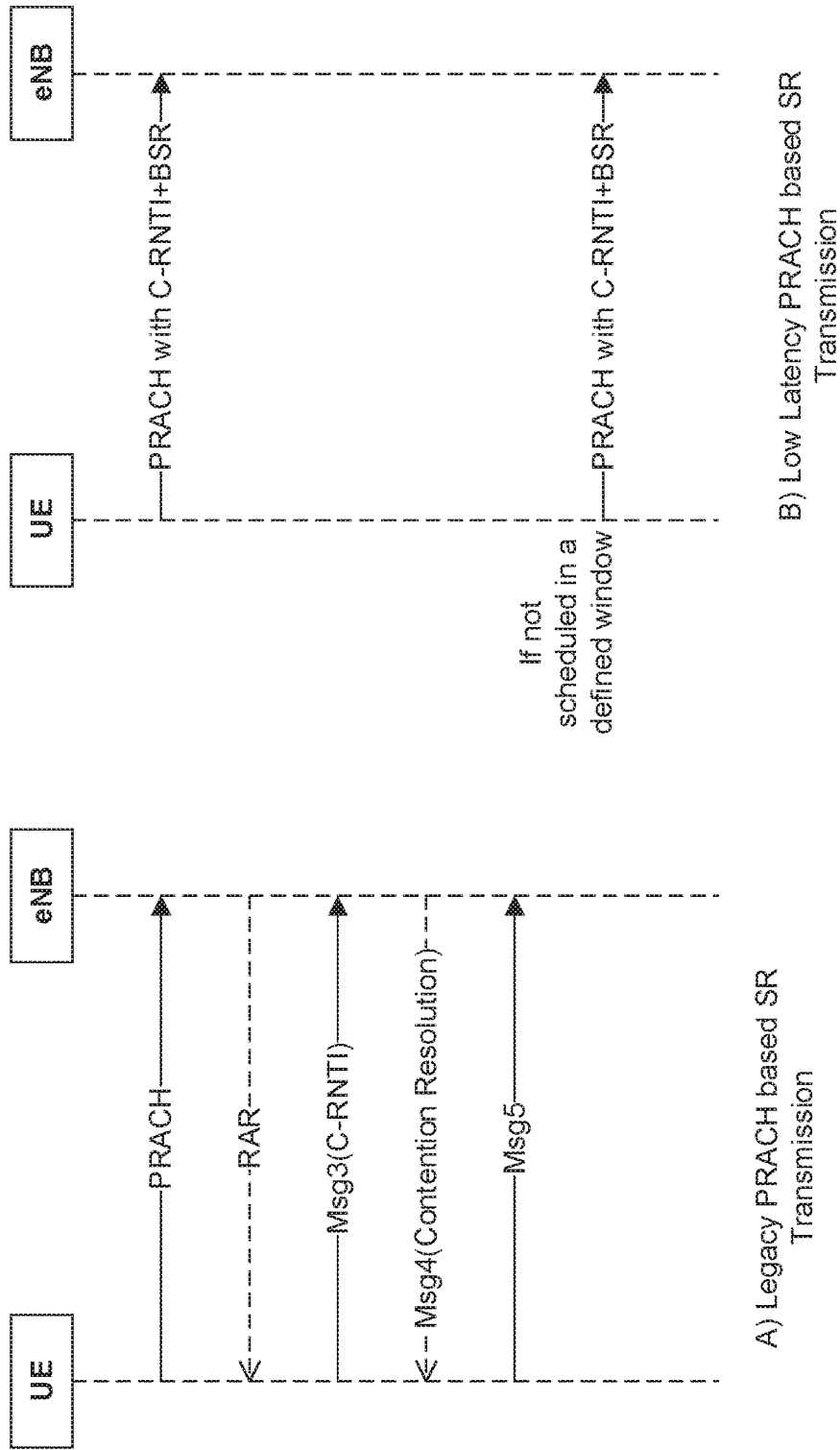
FIG. 3 depicts a legacy physical random access channel (PRACH) based scheduling request (SR) transmission compared to a low latency PRACH based SR transmission in accordance with an example.

FIG. 3 compares A) a legacy physical random access channel (PRACH) based scheduling request (SR) transmission with B) a low latency PRACH based SR transmission of the present technology. For example, in A) a legacy physical random access channel (PRACH) based scheduling request (SR) transmission includes a total of 5 messages in the entire PRACH based SR transmission procedure. For example, in the contention based random access procedure, the UE can send in to the eNB a PRACH signal. The eNB can issue to the UE a random access response (RAR). After receiving the RAR, the UE can send an Msg3 (the third message of the random access), and carries in the Msg3 a CCCH SDU (Common Control Channel Serving Data Unit, common control channel serving data unit) or a cell radio network temporary identifier (C-RNTI) of the UE for initiating the random access. After sending the Msg3, the UE can start a contention resolution timer (CRT)) and can receive, from the eNB, a contention resolution response message MSG4 (the fourth message of the RAR). The UE can then transmit an Msg5 (the fifth message).

However, in order to reduce the latency, the SR transmission and reception procedure of legacy physical random access channel (PRACH) based scheduling request (SR) transmission can be simplified. In one example, the SR procedure can be simplified by reducing the 5 total messages. For instance, to reduce latency for generating a low latency SR transmission framework, the PRACH and message including information, such as the C-RNTI and Buffer Status Report (BSR), can be transmitted together, as depicted in B) a low latency PRACH based SR transmission of FIG. 3.

In B) of FIG. 3, the user equipment (UE) can randomly select a physical random access channel (PRACH) preamble index for a PRACH transmission. The UE can multiplex the PRACH preamble index together with an SR message containing a cell radio network temporary identifier (C-RNTI) and a buffer status report (BSR) for the PRACH transmission. The UE can transmit, as a first message, to an enhanced node B (eNB), the PRACH preamble index multiplexed with the SR message in a subframe #(n) of the PRACH transmission, wherein n is a subframe number. If, for example, the SR is not scheduled within a predetermined time period, the UE can re-transmit to the eNB the PRACH transmission having the PRACH preamble index multiplexed together with a SR message containing the C-RNTI and the BSR.

In other words, the UE can transmit a new baseband signal by randomly selecting a PRACH preamble index multiplexed together with the SR message, which contains the UE's C-RNTI and BSR information at subframe n, wherein n is the subframe number. If an uplink grant is received at subframe (n+k), the UE can transmit the UE's uplink data; otherwise, the UE may transmit a new baseband signal with a new random preamble index at the configured PRACH subframe. It should be noted that k can be a positive integer and predefined and/or configured by a higher layer via master information block (MIB), system information block (SIB) or UE specific dedicated RRC signaling. That is, k can be a signal duration by the master information block (MIB), the system information block (SIB), or a UE-specific dedicated RRC signalling. Thus, low latency can be achieved by sending only 1 message for contention based scheduling request (SR) and a minimum delay can be an interval of 4 transmission time intervals (TTIs), which significantly reduces the latency for uplink transmission.

Figure 4:
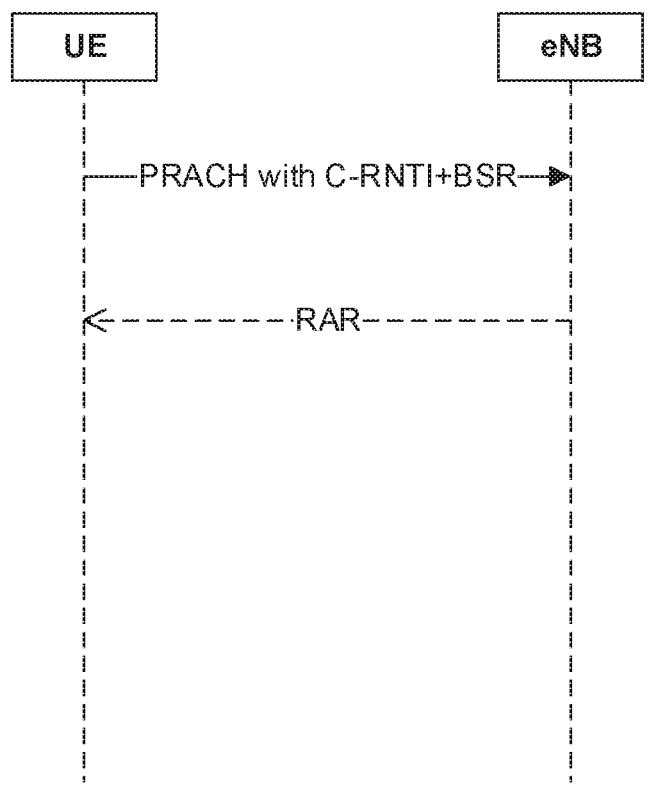
FIG. 4 illustrates an alternative low latency PRACH based SR transmission in accordance with an example.

Turning now to FIG. 4, an alternative low latency PRACH based SR transmission 400 is depicted. In one aspect, the UE can transmit to the eNB an alternative PRACH transmission having the PRACH preamble index multiplexed together with a SR message containing a cell radio network temporary identifier (C-RNTI) and a buffer status report (BSR). In order for the UE to explicitly acquire an SR decoding status, a Random Access Response (RAR) can be used. The RAR can contain the UE's C-RNTI instead of a temporary C-RNTI used in current contention based random access if the UE's data is correctly decoded. An uplink grant can be added in the RAR to schedule the UE's first transmission. That is, the RAR structure pattern used in FIG. 4 can be defined in FIG. 5 and the RAR 500 can consist of four fields: an R field, a Timing Advance Command field, an UL Grant field, and a C-RNTI, where "R" can be a reserved bit and can be 0, which can be the same as defined in section 6.2.3 in 3GPP TS 36.321.

FIG. 6 illustrates an example 600 of physical random access channel (PRACH) transmission signals in accordance with an example. That is, FIG. 6 illustrates the PRACH signal structure 602, where the value of signal duration k can be decided by a PRACH format. The cyclic prefix (CP) is a guard period between OFDM symbols with a time set to reduce or eliminate inter symbol interference. The sequence (SEQ) can indicate a PRACH baseband sequence, while the reserved field (RES) can indicate a blank or empty resource. It should be noted that a PRACH preamble and a contention based SR message can be multiplexed in a frequency-division multiplexing (FDM) or time-division multiplexing (TDM) manner or a combination of FDM and/or TDM.

FIG. 6 also illustrates the PRACH transmitting signal format 604. That is, the PRACH signal structure 604, which can be similar and/or identical to PRACH transmitting signal format 602, can include the cyclic prefix (CP), the PRACH baseband sequence (SEQ), and can include data. A first part can be the PRACH signal indicated in FIG. 6 as "PRACH", and can be based on a preamble index k and a second part can be the message signal indicated as "Msg". It should be noted that the reason the "Msg" portion includes the CP again is to reduce the inter-symbol interference which comes from the multi-path fading channel. The first PRACH signal may have interference to the Msg. The Msg has the same motivation as the CP before each OFDM symbols. Also, the message format before compression can be depicted in FIG. 12.

For example, in one aspect, an SR message can be transmitted in a reserved resource in the PRACH signal. FIG. 7 illustrates a table 700 (e.g., table 1) of low latency physical random access channel (PRACH) scheduling request (SR) transmission structure formats in accordance with an example. That is, table 700 of FIG. 7 includes the headings of PRACH structure format form 0-3, the cyclic prefixes (CP) in time Ts (e.g., Ts=1/(15000×2048) seconds), the SEQ in time Ts, the reserve resources, and the number of OFDM symbols available for data. In other words, table 700 of FIG. 7 summarizes the number of available OFDM symbols for a SR message transmission for different PRACH formats.

For instance, for PRACH format 0, 1 OFDM symbol can be used for SR message transmission. It should be noted that this option may be suitable for the synchronized UEs which can take advantage of the reserved resource for an SR message. For PRACH format 1, 7 OFDM symbols can be used for SR message transmission. For PRACH format 2, 2 OFDM symbols can be used for SR message transmission. For PRACH format 3, 10 OFDM symbols can be used for SR message transmission. Other numbers of OFDM symbols can be used for SR message transmission based on system requirements.

Figure 8:
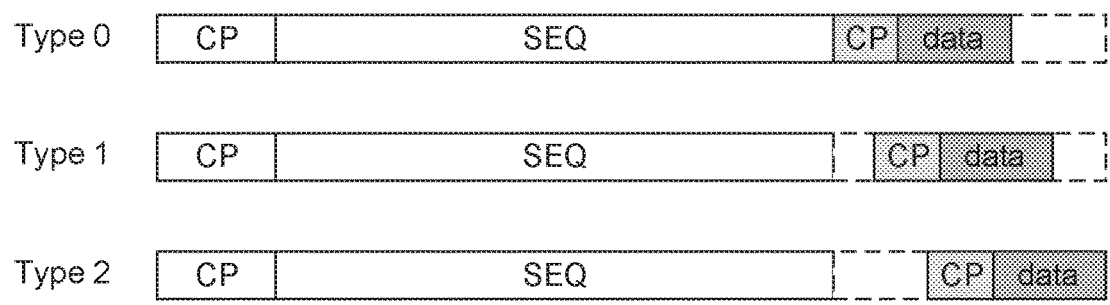
FIG. 8 illustrates a first option for low latency physical random access channel (PRACH) scheduling request (SR) transmission structures in accordance with an example.

Turning now to FIG. 8 a first option 800 for low latency physical random access channel (PRACH) scheduling request (SR) transmission structures is depicted. More specifically, the SR message payload can be added into the RES position, and the SR message payload offset type can be configured by eNodeB via the MIB, the SIB, and/or the UE-specific dedicated RRC signaling. As depicted in FIG. 8, three types of contention based SR transmission can be defined as 1) Type 0 which can indicate no sample offset is needed (e.g., the CP and data immediately follow the SEQ in FIG. 8), 2) Type 1 which can indicate that the SR message payload can be located in the middle of a RES area (e.g., the CP and data is between two empty resources that are adjacent to the SEQ and; and 3) Type 2 which can denote the SR message payload can be located at the end of the baseband signal. The decision for which of the three types of contention based SR transmission can be a cell specific or UE specific configuration. In addition the occupied OFDM symbol number may be also configured and can be in the range of [1, L], where L is the number of available OFDM symbol for data as defined in Table 1.

In one aspect, an SR message can be transmitted in the subsequent subframe after a PRACH preamble. For this option, the eNB can configure a PRACH transmission in inconsecutive subframes within one frame. For example, for PRACH format 0 (e.g., PRACH format 0 of FIG. 8), the eNB can configure PRACH transmission using PRACH configuration #12 (e.g., the PRACH can be transmitted in subframe #0, 2, 4, 6, 8 within one frame). The SR message can be transmitted in subframe #1, 3, 5, 7, and 9 within one frame.

Depending on the payload size of SR message, multiple potential resources (or SR transmission opportunities) can be defined in a subsequent subframe after the PRACH transmission. For example, if the payload size of SR message is relatively large (e.g., 7 bytes+24 bits CRC as shown in FIG. 12B) the SR transmission can span 1 OFDM symbol and 6 physical resource blocks (PRBs) in the frequency domain. The number of the resource elements (REs) allocated for the SR transmission can be 72 with 15 kHz subcarrier spacing. In another aspect, if the payload size of SR message is relatively small (e.g., 3 bytes+24 bits CRC as shown in FIG. 12C), the SR transmission can span 1 OFDM symbol and 2 PRBs in the frequency domain. The number of REs allocated for SR transmission can be 24 with 15 kHz subcarrier spacing.

Figure 9:
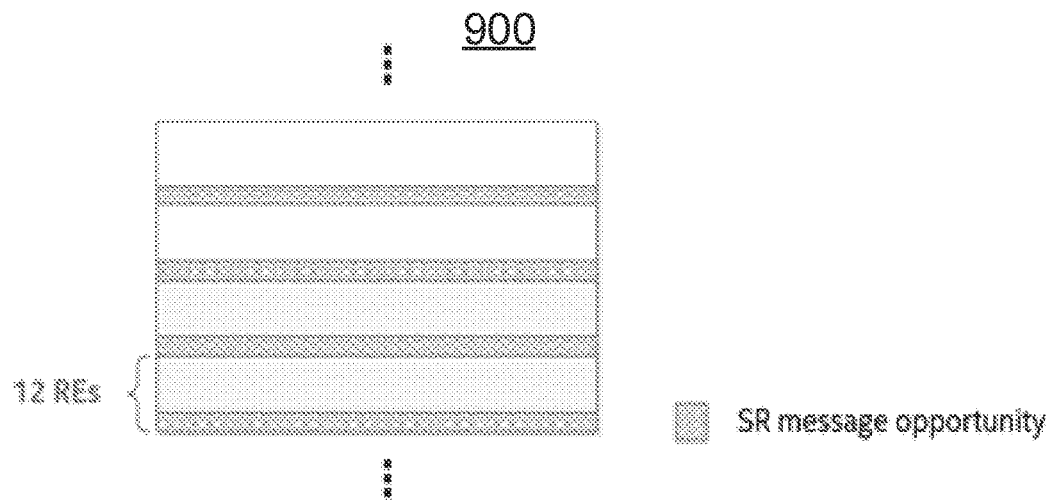
FIG. 9 illustrates a low latency physical random access channel (PRACH) scheduling request (SR) message transmission using a 1.25 kHz subcarrier spacing in accordance with an example.

In yet an additional aspect, 1.25 kHz subcarrier spacing can be used for a SR message transmission. In this case, the SR transmission can span 1 subframe and either a localized and/or distributed transmission can be used for the SR message transmission. For example, if SR message transmission occupies 72 REs, then the subcarrier index #0, 12, 24, etc., can be used for one SR message opportunity as shown in the FIG. 9, depicting a low latency physical random access channel (PRACH) scheduling request (SR) message transmission 900 using a 1.25 kHz subcarrier spacing. It should be note that in this case, a total of 12 SR transmission opportunities can be considered. It should be noted that using a 1.25 kHz subcarrier spacing option can be adopted for both unsynchronized and synchronized scenarios. For using the 15 kHz subcarrier spacing, the UE can follow a downlink timing for the SR message transmission (e.g., the transmission timing for PRACH and SR message can be aligned). It should be noted that in current LTE configuration, the SR is only allowed to transmit in some subframes periodically. For example, it can be only transmitted in the subframe 5 of each frame. In the case when 15 kHz subcarrier spacing is used, the number of resources or SR transmission opportunities can be reduced. In particular, 2 OFDM symbols can be grouped together for one SR transmission opportunity in the time domain.

Figure 10:
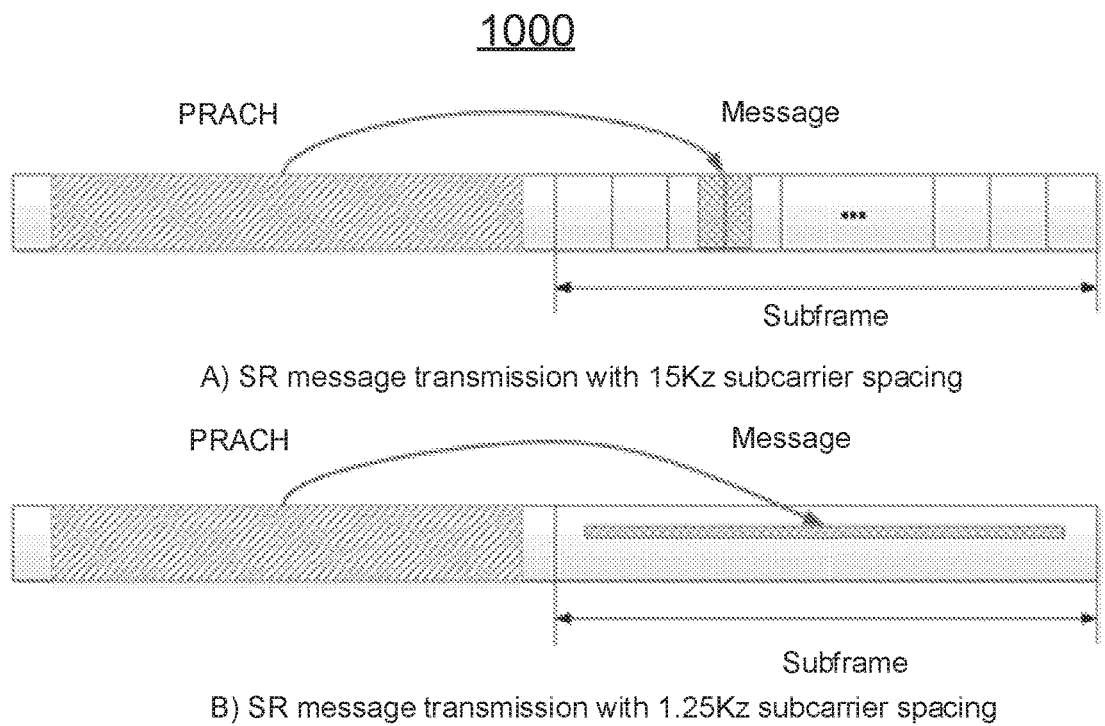
FIG. 10 illustrates a second option for low latency physical random access channel (PRACH) scheduling request (SR) transmission structures in accordance with an example.

FIG. 10 illustrates a second option 1000 for low latency physical random access channel (PRACH) scheduling request (SR) transmission. That is, FIG. 10 illustrates examples of the low latency contention based SR structure for unsynchronized scenarios using example A) where 15 kHz subcarrier spacing can be used for SR message transmission and example B) were 1.255 kHz subcarrier spacing can be used for SR message transmission. It should be noted that other bandwidths of subcarrier spacing can be extended in the second option 1000.

In one aspect, the SR message can be transmitted in PRBs adjacent to the PRACH preamble. As such, an additional N PRBs can be allocated adjacent to PRACH preamble, excluding the PUCCH region, whereby N can be a positive integer and predefined and/r configured by higher layers via the MIB, the SIB, and/or the UE-specific dedicated RRC signaling. Further, these N PRBs can be located at one side or both sides of the PRACH preamble depending on the configuration of a PRACH transmission.

In one aspect, the PRACH preamble can span 6 PRBs in the frequency domain. In addition, the PRACH can use guard bands to avoid the data interference at preamble edges. The subcarrier spacing for PRACH transmission can be 1.25 KHz and the length of unused subcarriers can be 25. Similarly, to avoid the interference at the PRACH preamble edge, guard bands can be used for contention based SR transmission. In one example, the number of unused subcarriers can also be 25.

Figure 11:
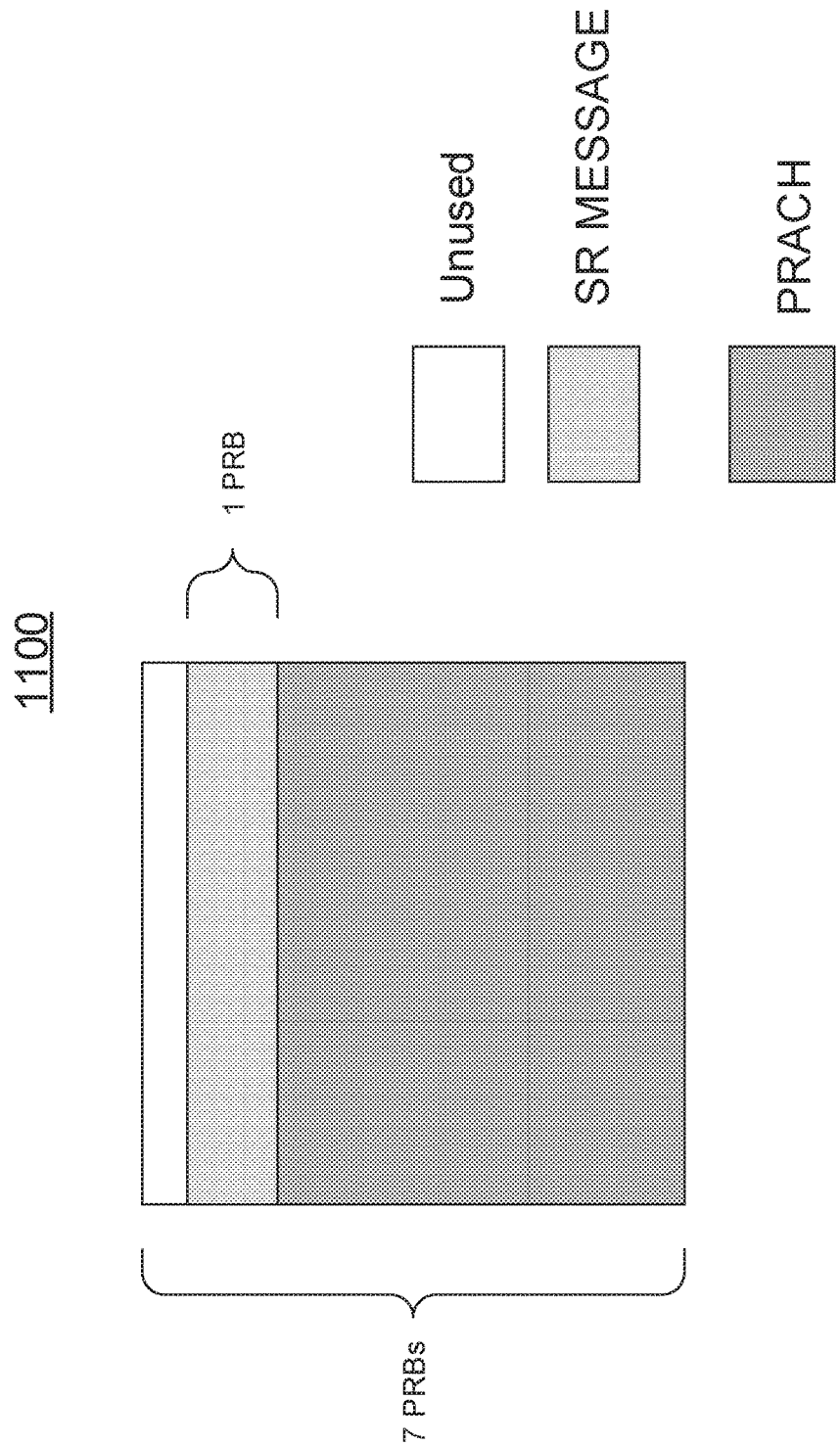
FIG. 11 illustrates a third option for low latency physical random access channel (PRACH) scheduling request (SR) transmission structures in accordance with an example.

FIG. 11 illustrates a third option 1100 for low latency physical random access channel (PRACH) scheduling request (SR) transmission structures in accordance with an example. That is, FIG. 11 illustrates one example of contention based SR design when 1 additional PRB is allocated for SR message transmission in an upper side a PRACH preamble. As shown in FIG. 11, unused subcarriers (e.g., "Unused") can be reserved for guard bands. In this example, the number of REs allocated for SR message transmission can be 144. It should be noted that in this case, a total number of REs can be 1008 for 7 PRBs, which can allow an eNB implementation due to the fact that a same Fast-Fourier Transform (FFT) size, i.e., 1024, can be used for receiver.

Depending on the payload size of the SR message, multiple resources can be defined within 1 PRB. For example, if the payload size of the SR message is small (e.g., 3 bytes+24 bits CRC as in FIG. 12C) at least 2 SR message transmission opportunities can be defined (e.g., such as 2 or 3 SR message transmission opportunities).

Turning now to the SR message structure format and resource mapping schemes, FIG. 12 illustrates payload structures 1200 of low latency physical random access channel (PRACH) scheduling request (SR) transmission structures in accordance with an example. FIG. 12 depicts the potential SR message payload structure that can be A) a short BSR structure with a MAC header, B) a long BSR structure with a MAC header, C) a short BSR structure without a MAC header, and D) a long BSR structure without a MAC header, respectively.

In particular, in one example, for a short BSR based structure, the number of bits for the SR message can be 40 while for a long BSR based structure, the number of bits can be 56. The actual number of bits in the SR message can depend on system requirements.

The payload size can be reduced to contain critical information for uplink transmission (e.g., the payload size can be reduced to only contain critical information). For instance, in the SR message, only part of the C-RNTI or UE ID may be included. The short BSR structure can also contain the logical channel identification (LCID). The buffer size may also be included in the SR message.

In one aspect, the technology also provides that a sequence identification (ID) for the PRACH transmission can be included in the SR message. The inclusion of the sequence ID can assist the eNB to identify a linkage between the PRACH transmission and the associated SR message.

In an additional aspect, the resource allocation for a subsequent uplink transmission can also be included. In this case, for example, the eNB may only need to send the acknowledgment/negative-acknowledgement (ACK/NACK) feedback to UE. For the ACK, the UE can transmit the uplink data in a requested resource.

In one aspect, for a cyclic redundancy code (CRC), 8, 16 or 24 parity check bits can be calculated based on the SR payload and/or a header that can be appended to the payload of the SR message. For example, a CRC code generator can have four generator polynomials with polynomial degrees 8, 12, 16 and 24, and one of the generator polynomials $g_{CRC8}$ (D), $g_{CRC16}(D)$, $g_{CRC24A}(D)$ and $g_{CRC24B}(D)$, where:

$$g_{CRC8}(D)=1+D+D^3+D^4+D^7+D^8 \qquad (1),$$

$$g_{CRC16}(D)=1+D^5+D^{12}+D^{16} \qquad (2),$$

$$g_{CRC24A}(D)=1+D+D^3+D^4++D^6+D^7+D^8+D^{10}+D^{11}+ \\ D^{14}+D^{17}+D^{18}+D^{23}+D^{24}, \qquad (3), \text{ and}$$

$$g_{CRC24B}(D)=1+D+D^5+D^{23}+D^{24} \qquad (4).$$

In one aspect, for channel coding and rate-matching, tail biting convolutional codes (TBCC) or turbo code (TC) can be adopted for channel coding for the SR message. As the TBCC outperforms the TC when the payload size is relatively small, the existing TBCC can be reused for the SR message. After the channel coding, rate matching can be performed to fill out the available REs within one SR transmission opportunity.

In another aspect, after the channel coding and rate-matched, a scrambling operation can be performed in order to randomize any interference, such as interference between the UE and the eNB. For initialization of the scrambling sequence, the follow options can be considered. In one aspect, a scrambling sequence can be initialized with $$c_{init}=N_{ID}^{cell} \quad (5),$$

where $N_{ID}^{cell}$ is the cell ID. In another aspect, a scrambling seed can be defined as a function of cell ID, and/or frame index and/or subframe index and/or OFDM symbol number, i.e., $$c_{init}=f(N_{ID}^{cell},n_{Frame}) \quad (6),$$

$$c_{init}=f(N_{ID}^{cell},n_{SF}) \quad (7), \text{ or}$$

$$c_{init}=f(N_{ID}^{cell},n_{SF},n_{symbol}) \quad (8).$$

Where $n_{Frame}$ is the frame number, $n_{SF}$ is the subframe index and $n_{symbol}$ is the OFDM symbol index within one subframe. In one aspect, the scrambling seed can be given as:

$$c_{init}=(n_{SF}\pm1)\cdot(2N_{ID}^{cell}+1)\cdot 2^9 \pm N_{ID}^{cell} \quad (9)$$

In one aspect, to ensure robust reception of the SR message, a modulation and coding scheme using either Binary Phase Shift Keying (BPSK) or Quaternary Phase Shift Keying (QPSK) can be used. Further, either a Single-Carrier Frequency-Division Multiple Access (SC-FDMA) or Orthogonal Frequency Division Multiple Access (OFDMA) scheme can be used for the SR message transmission.

For a Resource Mapping Scheme, as mentioned above, multiple SR transmission opportunities can be defined depending on the SR message payload size and options for multiplexing a PRACH preamble and the SR message. Several options can be considered to map the SR message to the transmission resource. In one aspect, a UE can randomly select one SR transmission opportunity for the transmission SR message. In another aspect, the UE can link the SR transmission to a PRACH preamble signature. It should be note that when the UE transmits the PRACH preamble, the UE transmits with a specific pattern and the specific pattern can be called a "Signature". In each LTE cell, a total of 64 PRACH preamble signature are available and UE select randomly one of these signatures.

For example, the UE can transmit the SR message in a $p^{th}$ SR transmission opportunity, whereby p can be defined as a function of the sequence ID used for PRACH transmission, which can be defined as:

$$p=f(I_{PRACH}) \quad (10),$$

Where $I_{PRACH}$ is the sequence ID for PRACH transmission. In an additional aspect, a PRACH can carry certain information for an SR message. In one example, a PRACH may carry at most 6 bit information for an SR message. In another example, 3-bit information for the SR message can be carried in the PRACH.

FIG. 12 can also depict the SR message prior to a compression operation. The preamble index k can be selected randomly by a UE for contention based access. In one aspect, the preamble index k can be calculated based on the BSR, the C-RNTI, and subframe #(n) for a physical random access channel (PRACH) transmission and when generating SR signals, as depicted in FIG. 6. For example, a preamble index generation can be according to the equation:

$$k(i)=(b(i)+c(i))\bmod 2, \quad (11)$$

where k(i) indicates can be the "i-th" bit in k, b(i) is a Buffer Size Indicator (BSI), c(i) denotes the scramble sequence, which can be generated based on the C-RNTI associated with a current SR message, subframe #(n), and cell ID. For example, in one aspect, the c(i) generation can be an initialization value of $c_{init}$, which can be the same as PUSCH, which may use the equation:

$$c_{init}=n_{RNTI}\times 2^{14}+n_{sf}\times 2^9+N_{ID}^{cell}, \quad (12)$$

where $n_{RNTI}$ is the value of C-RNTI, $n_{sf}$ denotes the subframe index within a frame, and $N_{ID}^{Cell}$ refers to the cell ID.

Since there are a total of 64 preamble indexes, there can be a total of 6 bits used for the buffer size indicator (BSI) transmission. The 6 bits BSI can be used to indicate a total buffer size for all Logical Channel Groups (LCGs), and a predetermine value can be used for a buffer size indicator. Alternatively, the preamble index within a number of random access (RA)-Preambles can also be used. The BSI bit numbers can depend on the configuration of the number of random access (RA)-Preambles. Therefore, at least 4 preamble indexes can be used. A value taken by BSI, which can have a predefined indication, can be predetermined and/or a high layer configuration for BSI can be used as the value of the BSI.

As depicted in FIG. 12, for both C) short BSR structure without the MAC header and D) the long BSR structure without the MAC header, the MAC header is no longer needed for SR message transmission since the transmission format is transparent between eNB and UE. Therefore, the new SR message may only contain the C-RNTI using the format of C) short BSR structure without the MAC header and D) the long BSR structure without the MAC header in FIG. 12.

In one aspect, the SR message can be coded by a CRC sequence, such as the CRC sequence that can be the same as the PUSCH. Alternatively, to achieve a lower coding rate, a shorter CRC sequence can be used, such as, for example, an 8-bit CRC sequence. In this way, a maximum coding rate can be equal to 24/144=0.1667, which can be a 70 percent (%) improvement as compared to former SR message format. In one aspect, an eNB signal detection procedure can include, an eNB, for example, first detecting a PRACH signal to obtain an estimated channel and preamble index. The C-RNTI can be obtained by the eNB by decoding the SR message based on the estimated channel. A buffer size can be acquired by the eNB by descrambling the preamble index.

Figure 13:
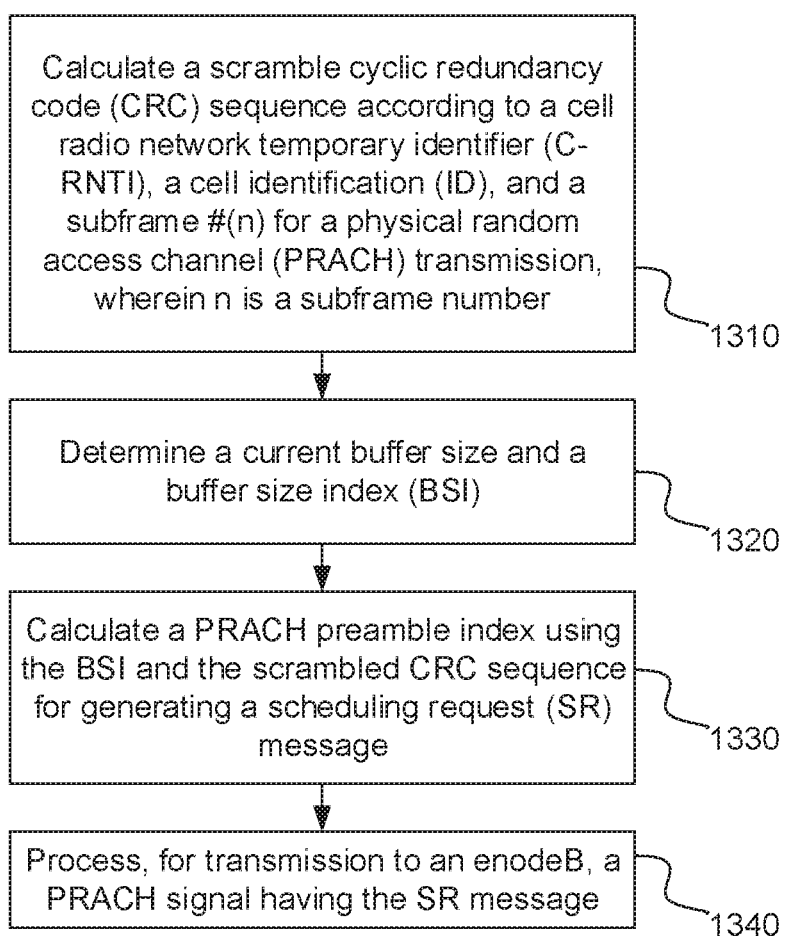
FIG. 13 illustrates a flow chart for transmitting a low latency physical random access channel (PRACH) scheduling request (SR) transmission in accordance with an example.

FIG. 13 illustrates a flow chart 1300 for transmitting a low latency physical random access channel (PRACH) scheduling request (SR) transmission in accordance with an example. FIG. 13 depicts functionality of, for example, a user equipment (UE) operable to perform low latency physical random access channel (PRACH) scheduling request (SR) transmission in accordance with an example. The functionality 1300 can be implemented as a method or the functionality 1300 can be executed as instructions on a machine, where the instructions are included on at least one computer readable medium or one non-transitory machine readable storage medium. One or more processors and memory can be configured to calculate a scrambled cyclic redundancy code (CRC) sequence according to a cell radio network temporary identifier (C-RNTI), a cell identification (ID), and a subframe #(n) for a physical random access channel (PRACH) transmission, wherein n is a subframe number, as in block 1310. The one or more processors and memory can be configured to determine a current buffer size and a buffer size index (BSI), as in block 1320. The one or more processors and memory can be configured to calculate a PRACH preamble index using the BSI and the scrambled CRC sequence for generating a scheduling request (SR) message, as in block 1330. That is, a PRACH preamble index can be calculated using the BSI and the scrambled CRC sequence. The one or more processors and memory can be configured to transmit the PRACH signal having the SR message, as in block 1340.

Figure 14:
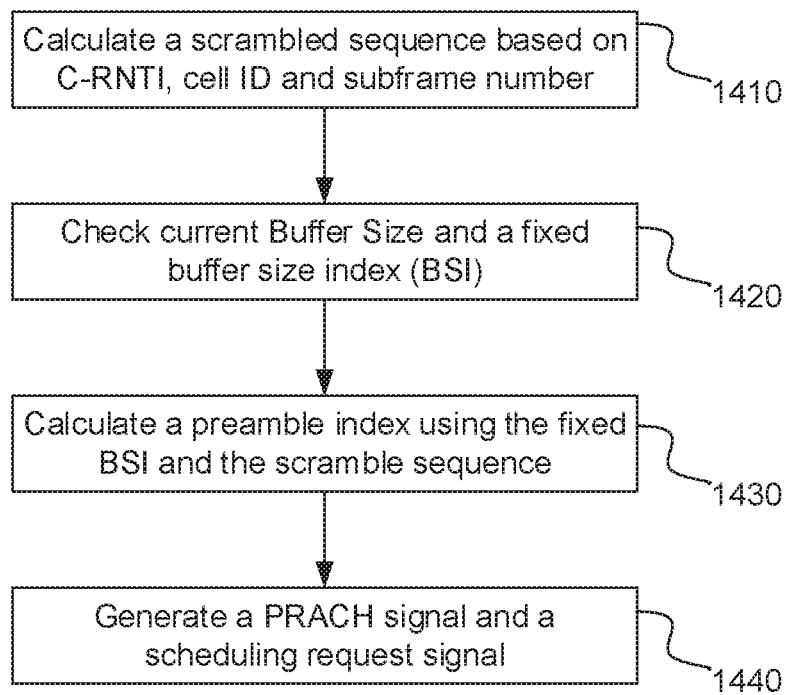
FIG. 14 illustrates a flow chart for generating a low latency physical random access channel (PRACH) scheduling request (SR) transmission in accordance with an example.

FIG. 14 illustrates a flow chart 1400 for generating a low latency physical random access channel (PRACH) scheduling request (SR) transmission in accordance with an example. FIG. 14 depicts functionality of, for example, a user equipment (UE) operable to perform low latency physical random access channel (PRACH) scheduling request (SR) transmission in accordance with an example. The functionality 1400 can be implemented as a method or the functionality 1400 can be executed as instructions on a machine, where the instructions are included on at least one computer readable medium or one non-transitory machine readable storage medium. One or more processors and memory can be configured to calculate a scrambled cyclic redundancy code (CRC) sequence according to a cell radio network temporary identifier (C-RNTI), a cell identification (ID), and a subframe #(n) for a physical random access channel (PRACH) transmission, wherein n is a subframe number, as in block 1410. The one or more processors and memory can be configured to check a current buffer size and a fixed buffer size index (BSI), as in block 1420. The one or more processors and memory can be configured to calculate a PRACH preamble index using the fixed BSI and the scrambled CRC sequence for generating a scheduling request (SR) message, as in block 1430. That is, a PRACH preamble index can be calculated using the fixed BSI and the scrambled CRC sequence. The one or more processors and memory can be configured to generate a PRACH and the SR message signal for a PRACH transmission, as in block 1440.

It should be noted that each of the following can be included in FIG. 14. In other words, each of the following may be included in each of the actions and/or in conjunction with one or more of the actions described in FIG. 14. For example, the SR messages can be located at the same Resource Blocks (RBs) as a PRACH in time domain multiplexing. The SR messages can are generated based on Single-Carrier Frequency-Division Multiple Access (SC-FDMA) or Orthogonal Frequency Division Multiple Access (OFDMA). The SR messages can be mapped at the time domain reserved resource in PRACH subframes. The eNB may configure message location by high layer signaling with a message offset indicator. The SR messages can have a Type 0 format indicating no sample offset is needed; Type 1 format indicating that the payload of the SR message is located the middle of reserved area; Type 2 format denotes that the payload of the SR message can be located the end of the baseband signal. The SR message payload can contain a MAC header, SR, short Buffer Status Report (BSR) or long BSR, and UE's Cell Radio Network Temporary Identify (C-RNTI). Also, a SR time window can be configured by the eNodeB for the SR message. In one aspect, if the UE is not scheduled within the subframes of a defined size according to the SR time window, the UE can re-transmit a former message with PRACH at next PRACH transmission subframe. In one aspect, the UE can receive from the eNB a Random Access Response (RAR) containing UE's C-RNTI to resolve the contention. If the UE detects the UE's C-RNTI in the RAR, the UE can consider the UE's SR message to be successfully decoded by the eNB successfully. Alternatively if the UE does not detect the UE's C-RNTI in the RAR, the UE can consider the UE's SR message to be unsuccessfully decoded.

Alternatively, physical resource blocks of the SR message can be allocated as the same PRB as PRACH signals and in a time domain multiplexing way. The preamble index of the PRACH signal can be generated based on the SR message. The preamble index generation can be based on the SR message content, cell ID, subframe number (e.g., subframe number #(n)) and a radio network temporary identifier (RNTI). The SR message can be generated based on a SC-FDMA or OFDMA waveform.

In one aspect, the UE can transmit the SR message associated with PRACH signal to send the UE's SR message along with the BSR and/or BSI. The SR message can be implicitly transmitted in the message associated with PRACH signal. The UE's C-RNTI can be transmitted in the message part of the SR message. The UE's BSR can be transmitted implicitly in a PRACH preamble index. If the RRC signal element number of (RA)-Preambles is configured with a short value, the BSI can be used to generate a preamble index instead of the BSR. The preamble index can be generated based on a scramble sequence, which may be generated by the cell ID, the C-RNTI, and the subframe number.

In one aspect, an eNB can decode the BSR and the C-RNTI based on the message associated with PRACH signal. The eNB can detect a preamble index and frequency domain channel based on PRACH signal, then decode C-RNTI from data part, finally decode the BSR or BSI based on preamble index and decoded C-RNTI.

Figure 15:
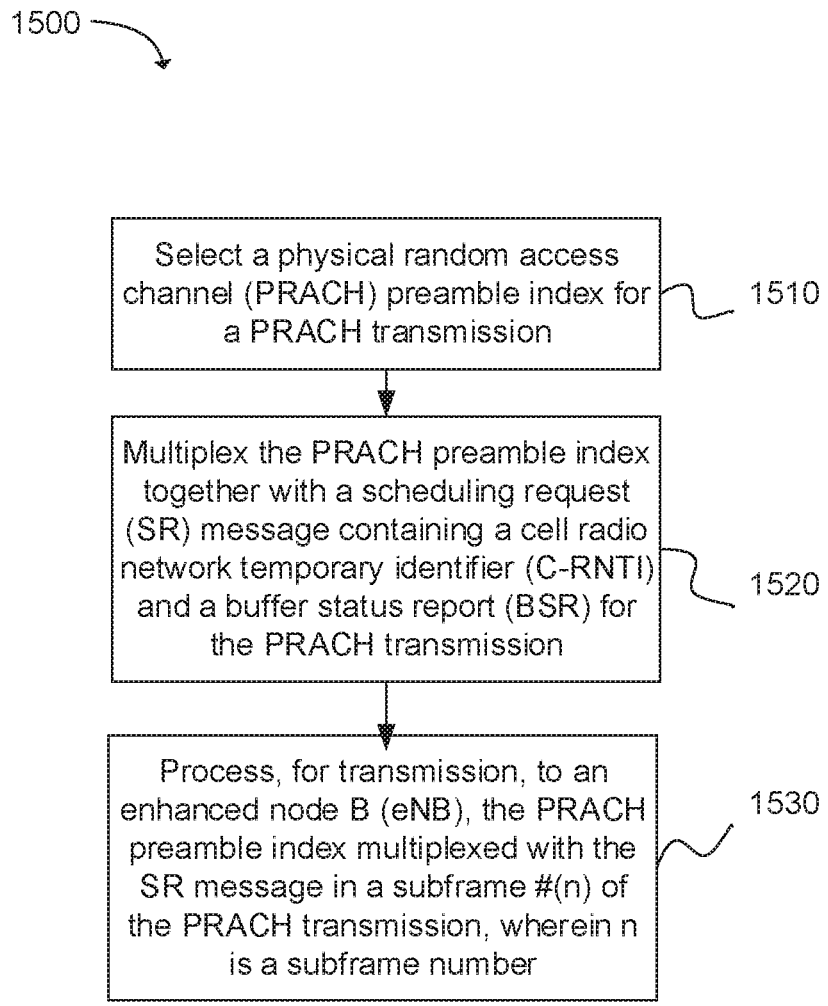
FIG. 15 illustrates depicts functionality of a user equipment (UE) operable to perform decreasing latency for contention based scheduling request (SR) with an evolved node B (eNB) in accordance with an example.

FIG. 15 illustrates depicts functionality 1500 of a user equipment (UE) operable to perform decreasing latency for contention based scheduling request (SR) with an evolved node B (eNB) in accordance with an example. The functionality 1500 can be implemented as a method or the functionality 1500 can be executed as instructions on a machine, where the instructions are included on at least one computer readable medium or one non-transitory machine readable storage medium. One or more processors and memory can be configured to select a physical random access channel (PRACH) preamble index for a PRACH transmission, as in block 1510. The one or more processors and memory can be configured to multiplex the PRACH preamble index together with a SR message containing a cell radio network temporary identifier (C-RNTI) and a buffer status report (BSR) for the PRACH transmission, as in block 1520. The one or more processors and memory can be configured to process, for transmission, to an enhanced node B (eNB), the PRACH preamble index multiplexed with the SR message in a subframe #(n) of the PRACH transmission, wherein n is a subframe number, as in block 1530.

Figure 16:
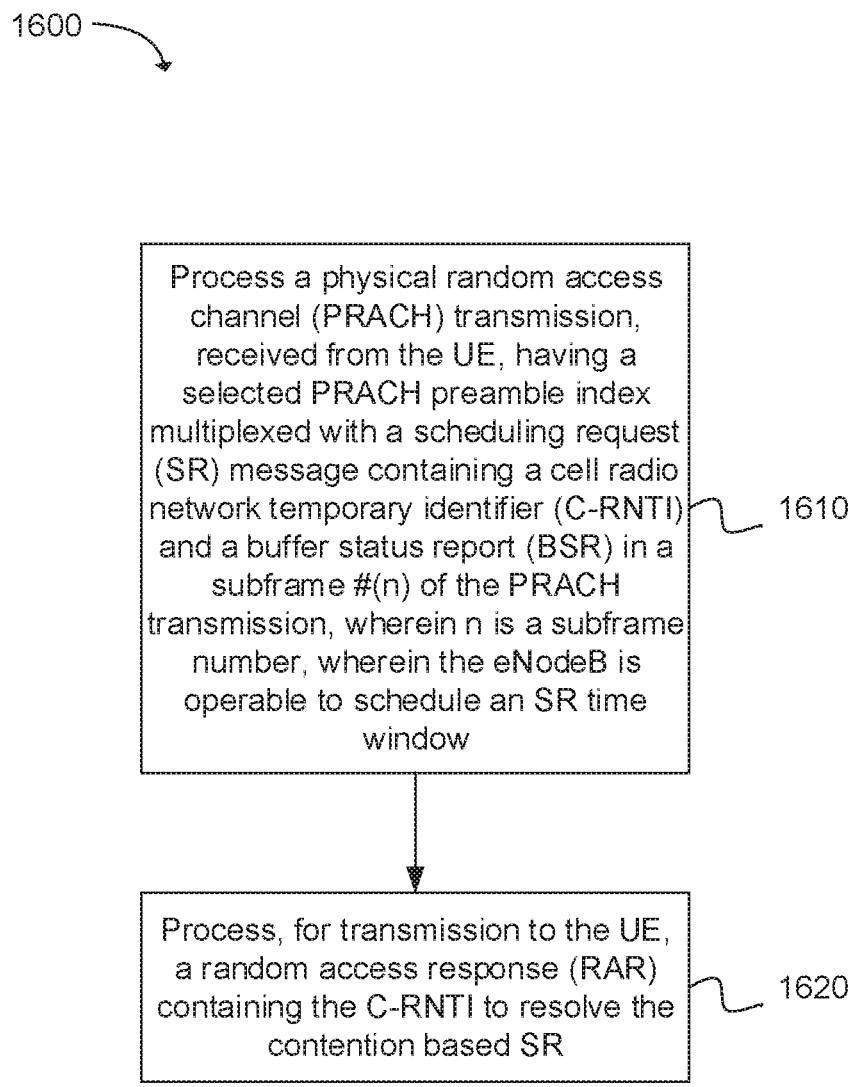
FIG. 16 depicts functionality of an evolved node B (eNB) operable to decreasing latency for contention based scheduling request (SR) with a user equipment (UE) in accordance with an example.

FIG. 16 depicts functionality 1600 of an evolved node B (eNB) operable to decreasing latency for contention based scheduling request (SR) with a user equipment (UE) in accordance with an example; The functionality 1600 can be implemented as a method or the functionality 1600 can be executed as instructions on a machine, where the instructions are included on at least one computer readable medium or one non-transitory machine readable storage medium. One or more processors and memory can be configured to receive, from the UE, a physical random access channel (PRACH) transmission having a randomly selected PRACH preamble index multiplexed with a scheduling request (SR) message containing a cell radio network temporary identifier (C-RNTI) and a buffer status report (BSR) in a subframe #(n) of the PRACH transmission, wherein n is a subframe number and the eNodeB is operable to schedule an SR time window, as in block 1610. One or more processors and memory can be configured to process, for transmission to the UE, a random access response (RAR) containing the C-RNTI to resolve the contention based SR, as in block 1620.

Figure 17:
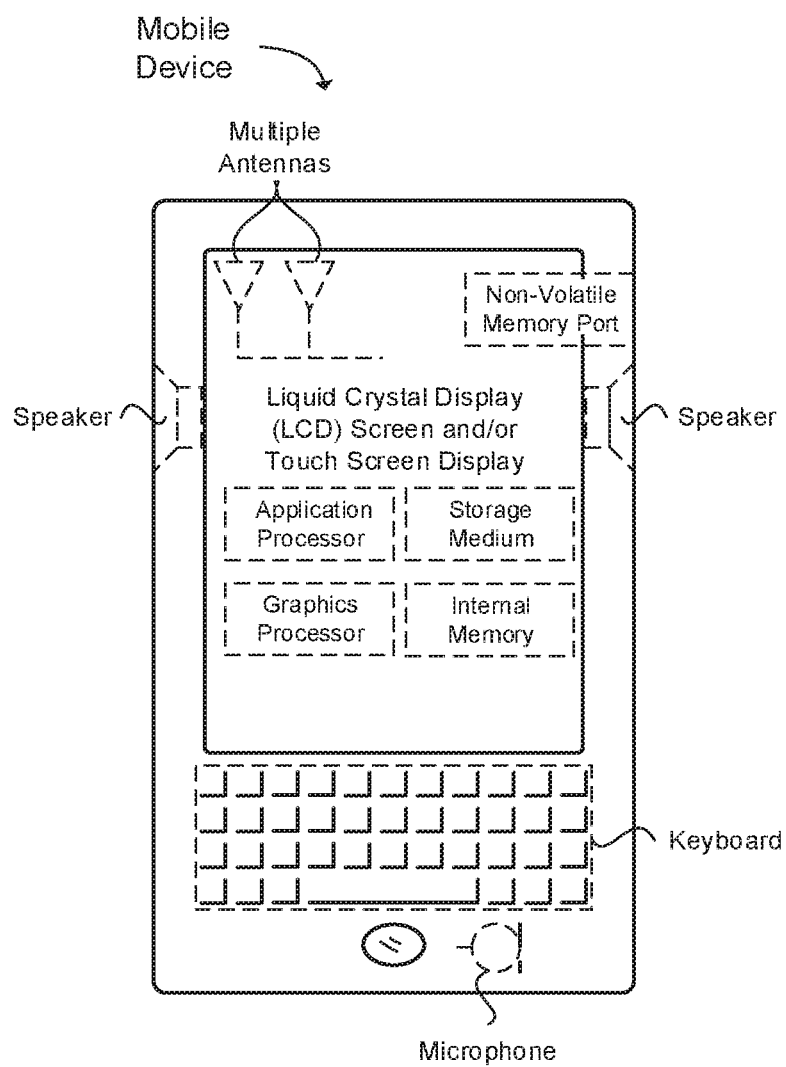
FIG. 17 illustrates a diagram of a wireless device (e.g., UE) in accordance with an example.

FIG. 17 illustrates a diagram 1700 of a wireless device (e.g., UE) in accordance with an example. FIG. 17 provides an example illustration of the wireless device, such as a user equipment (UE), a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communication with the application processor, the graphics processor, the display, the non-volatile memory port, and/or internal memory. In one aspect, the application processor and graphics processor are storage mediums.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Figure 18:
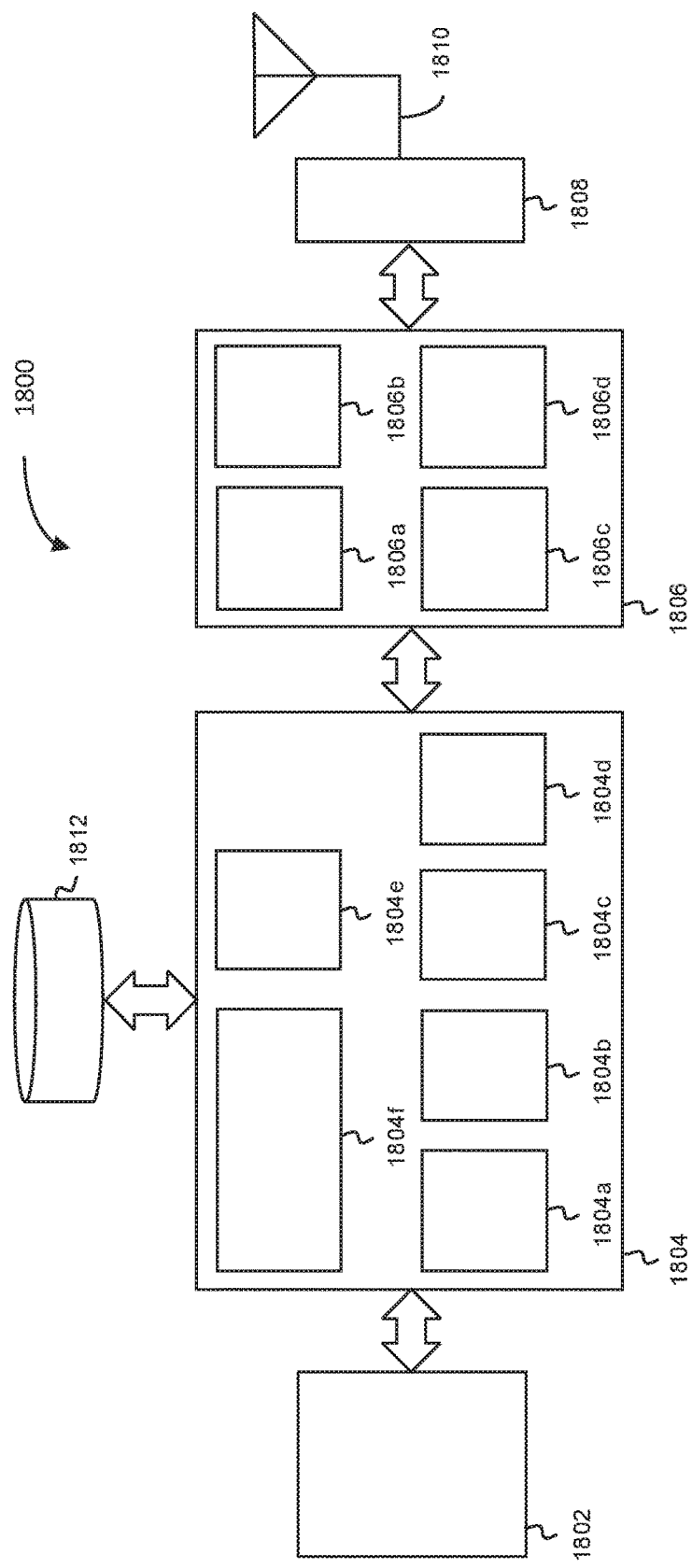
FIG. 18 illustrates a diagram of a node (e.g., eNB) and wireless device (e.g., UE) in accordance with an example.

FIG. 18 illustrates, for one aspect, example components of a User Equipment (UE) device 1800. In some aspects, the UE device 1800 can include application circuitry 1802, baseband circuitry 1804, Radio Frequency (RF) circuitry 1806, front-end module (FEM) circuitry 1808 and one or more antennas 1810, coupled together at least as shown.

The application circuitry 1802 can include one or more application processors. For example, the application circuitry 1802 can include circuitry such as, but not limited to, one or more single-core or multi-core processors. The processor(s) can include any combination of general-purpose processors and dedicated processors (e.g., graphics processors, application processors, etc.). The processors can be coupled with and/or can include a storage medium 1812, and can be configured to execute instructions stored in the storage medium 1812 to enable various applications and/or operating systems to run on the system.

The baseband circuitry 1804 can include circuitry such as, but not limited to, one or more single-core or multi-core processors. The baseband circuitry 1804 can include one or more baseband processors and/or control logic to process baseband signals received from a receive signal path of the RF circuitry 1806 and to generate baseband signals for a transmit signal path of the RF circuitry 1806. Baseband processing circuitry 1804 can interface with the application circuitry 1802 for generation and processing of the baseband signals and for controlling operations of the RF circuitry 1806. For example, in some aspects, the baseband circuitry 1804 can include a second generation (2G) baseband processor 1804a, third generation (3G) baseband processor 1804b, fourth generation (4G) baseband processor 1804c, and/or other baseband processor(s) 1804d for other existing generations, generations in development or to be developed in the future (e.g., fifth generation (5G), 6G, etc.). The baseband circuitry 1804 (e.g., one or more of baseband processors 1804a-d) can handle various radio control functions that enable communication with one or more radio networks via the RF circuitry 1806. The radio control functions can include, but are not limited to, signal modulation/demodulation, encoding/decoding, radio frequency shifting, etc. In some aspects, modulation/demodulation circuitry of the baseband circuitry 1804 can include Fast-Fourier Transform (FFT), precoding, and/or constellation mapping/demapping functionality. In some aspects, encoding/decoding circuitry of the baseband circuitry 1804 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1804 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1804e of the baseband circuitry 1804 can be configured to run elements of the protocol stack for signaling of the PHY, MAC, RLC, PDCP and/or RRC layers. In some aspects, the baseband circuitry can include one or more audio digital signal processor(s) (DSP) 1804f The audio DSP(s) 1804f can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1804 and the application circuitry 1802 can be implemented together such as, for example, on a system on a chip (SOC).

In some aspects, the baseband circuitry 1804 can provide for communication compatible with one or more radio technologies. For example, in some aspects, the baseband circuitry 1804 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 1804 is configured to support radio communications of more than one wireless protocol can be referred to as multi-mode baseband circuitry.

RF circuitry 1806 can enable communication with wireless networks using modulated electromagnetic radiation through a non-solid medium. In various aspects, the RF circuitry 1806 can include switches, filters, amplifiers, etc. to facilitate the communication with the wireless network. RF circuitry 1806 can include a receive signal path which can include circuitry to down-convert RF signals received from the FEM circuitry 1808 and provide baseband signals to the baseband circuitry 1804. RF circuitry 1806 can also include a transmit signal path which can include circuitry to up-convert baseband signals provided by the baseband circuitry 1804 and provide RF output signals to the FEM circuitry 1808 for transmission.

In some aspects, the RF circuitry 1806 can include a receive signal path and a transmit signal path. The receive signal path of the RF circuitry 1806 can include mixer circuitry 1806a, amplifier circuitry 1806b and filter circuitry 1806c. The transmit signal path of the RF circuitry 1806 can include filter circuitry 1806c and mixer circuitry 1806a. RF circuitry 1806 can also include synthesizer circuitry 1806d for synthesizing a frequency for use by the mixer circuitry 1806a of the receive signal path and the transmit signal path. In some aspects, the mixer circuitry 1806a of the receive signal path can be configured to down-convert RF signals received from the FEM circuitry 1808 based on the synthesized frequency provided by synthesizer circuitry 1806d. The amplifier circuitry 1806b can be configured to amplify the down-converted signals and the filter circuitry 1806c can be a low-pass filter (LPF) or band-pass filter (BPF) configured to remove unwanted signals from the down-converted signals to generate output baseband signals. Output baseband signals can be provided to the baseband circuitry 1804 for further processing. In some aspects, the output baseband signals can be zero-frequency baseband signals, although this is not a requirement. In some aspects, mixer circuitry 1806a of the receive signal path can comprise passive mixers, although the scope of the aspects is not limited in this respect.

In some aspects, the mixer circuitry 1806a of the transmit signal path can be configured to up-convert input baseband signals based on the synthesized frequency provided by the synthesizer circuitry 1806d to generate RF output signals for the FEM circuitry 1808. The baseband signals can be provided by the baseband circuitry 1804 and can be filtered by filter circuitry 1806c. The filter circuitry 1806c can include a low-pass filter (LPF), although the scope of the aspects is not limited in this respect.

In some aspects, the mixer circuitry 1806a of the receive signal path and the mixer circuitry 1806a of the transmit signal path can include two or more mixers and can be arranged for quadrature downconversion and/or upconversion respectively. In some aspects, the mixer circuitry 1806a of the receive signal path and the mixer circuitry 1806a of the transmit signal path can include two or more mixers and can be arranged for image rejection (e.g., Hartley image rejection). In some aspects, the mixer circuitry 1806a of the receive signal path and the mixer circuitry 1806a can be arranged for direct downconversion and/or direct upconversion, respectively. In some aspects, the mixer circuitry 1806a of the receive signal path and the mixer circuitry 1806a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1806 can include analog-to-digital converter (ADC) and digital-to-analog converter (DAC) circuitry and the baseband circuitry 1804 can include a digital baseband interface to communicate with the RF circuitry 1806.

In some dual-mode embodiments, a separate radio IC circuitry can be provided for processing signals for each spectrum, although the scope of the embodiments is not limited in this respect.

In some embodiments, the synthesizer circuitry 1806d can be a fractional-N synthesizer or a fractional N/N+1 synthesizer, although the scope of the embodiments is not limited in this respect as other types of frequency synthesizers can be suitable. For example, synthesizer circuitry 1806d can be a delta-sigma synthesizer, a frequency multiplier, or a synthesizer comprising a phase-locked loop with a frequency divider.

The synthesizer circuitry 1806d can be configured to synthesize an output frequency for use by the mixer circuitry 1806a of the RF circuitry 1806 based on a frequency input and a divider control input. In some embodiments, the synthesizer circuitry 1806d can be a fractional N/N+1 synthesizer.

In some embodiments, frequency input can be provided by a voltage controlled oscillator (VCO), although that is not a requirement. Divider control input can be provided by either the baseband circuitry 1804 or the applications processor 1802 depending on the desired output frequency. In some embodiments, a divider control input (e.g., N) can be determined from a look-up table based on a channel indicated by the applications processor 1802.

Synthesizer circuitry 1806d of the RF circuitry 1806 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1806d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 1806 can include an IQ/polar converter.

FEM circuitry 1808 can include a receive signal path which can include circuitry configured to operate on RF signals received from one or more antennas 1810, amplify the received signals and provide the amplified versions of the received signals to the RF circuitry 1806 for further processing. FEM circuitry 1808 can also include a transmit signal path which can include circuitry configured to amplify signals for transmission provided by the RF circuitry 1806 for transmission by one or more of the one or more antennas 1810.

In some embodiments, the FEM circuitry 1808 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 1806). The transmit signal path of the FEM circuitry 1808 can include a power amplifier (PA) to amplify input RF signals (e.g., provided by RF circuitry 1806), and one or more filters to generate RF signals for subsequent transmission (e.g., by one or more of the one or more antennas 1810.

In some embodiments, the UE device 1800 can include additional elements such as, for example, memory/storage, display, camera, sensor, and/or input/output (I/O) interface.

Figure 19:
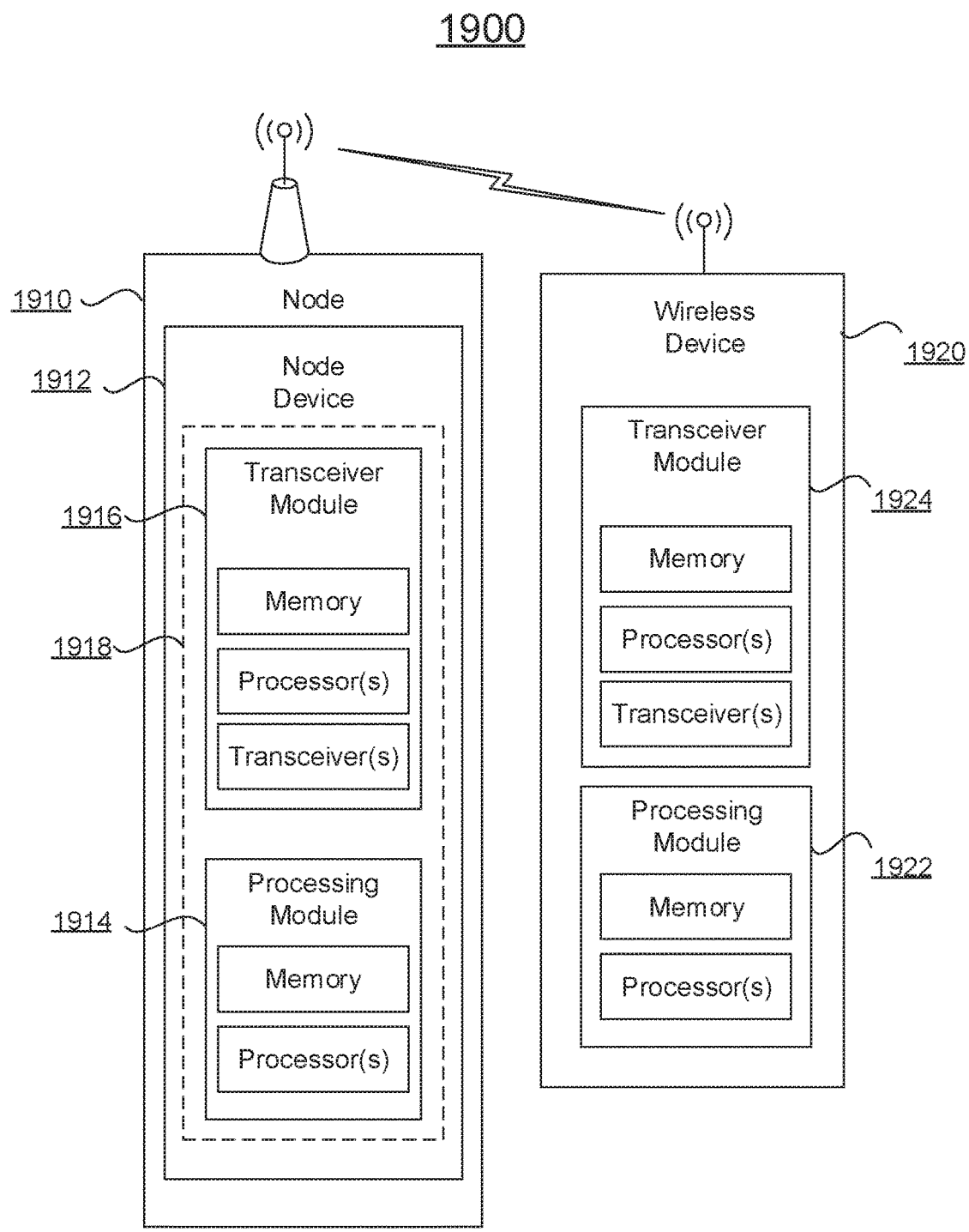
FIG. 19 illustrates a diagram of example components of a User Equipment (UE) device in accordance with an example.

FIG. 19 illustrates a diagram 1900 of a node 1910 (e.g., eNB and/or a Serving GPRS Support Node) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 1910 can include a node device 1912. The node device 1912 or the node 1910 can be configured to communicate with the wireless device 1920. The node device 1912 can be configured to implement the technology described. The node device 1912 can include a processing module 1914 and a transceiver module 1916. In one aspect, the node device 1912 can include the transceiver module 1916 and the processing module 1914 forming a circuitry 1918 for the node 1910. In one aspect, the transceiver module 1916 and the processing module 1914 can form a circuitry of the node device 1912. The processing module 1914 can include one or more processors and memory. In one embodiment, the processing module 1922 can include one or more application processors. The transceiver module 1916 can include a transceiver and one or more processors and memory. In one embodiment, the transceiver module 1916 can include a baseband processor.

The wireless device 1920 can include a transceiver module 1924 and a processing module 1922. The processing module 1922 can include one or more processors and memory. In one embodiment, the processing module 1922 can include one or more application processors. The transceiver module 1924 can include a transceiver and one or more processors and memory. In one embodiment, the transceiver module 1924 can include a baseband processor. The wireless device 1920 can be configured to implement the technology described. The node 1910 and the wireless devices 1920 can also include one or more storage mediums, such as the transceiver module 1916, 1924 and/or the processing module 1914, 1922.

EXAMPLES

The following examples pertain to specific technology embodiments and point out specific features, elements, or steps that can be used or otherwise combined in achieving such embodiments.

Example 1 includes an apparatus of a user equipment (UE), the UE configured to decrease latency for contention based scheduling request (SR), the apparatus comprising one or more processors and memory configured to: select a physical random access channel (PRACH) preamble index for a PRACH transmission; multiplex the PRACH preamble index together with an SR message containing a cell radio network temporary identifier (C-RNTI) and a buffer status report (BSR) for the PRACH transmission; and process, for transmission, to an enhanced node B (eNB), the PRACH preamble index multiplexed with the SR message in a subframe #(n) of the PRACH transmission, wherein n is a subframe number.

Example 2 includes the apparatus of example 1, wherein the one or more processors and memory are further configured to process, for transmission to the eNB, the PRACH PREAMBLE index multiplexed with the SR message for the PRACH transmission in a subframe #(n+k), wherein k is a positive integer, wherein k is a signal duration by a master information block (MIB), a system information block (SIB), or a UE-specific dedicated RRC signalling.

Example 3 includes the apparatus of example 1, wherein the one or more processors and memory are further configured to process, for transmission to the eNB, the SR message in a reserved PRACH resource of the PRACH transmission.

Example 4 includes the apparatus of example 1, wherein the one or more processors and memory are further configured to map the PRACH preamble index and the SR message at a same resource block (RB) as the PRACH transmission in a time division.

Example 5 includes the apparatus of example 1, wherein the one or a processors and memory are further configured to map the SR message to a reserved PRACH resource of the PRACH transmission in a time domain division.

Example 6 includes the apparatus of example 5, wherein the SR message is mapped to the reserved PRACH resource of the PRACH according to a first type with a SR message payload has no offset following a PRACH baseband sequence (SEQ), a second type having an SR message payload in a middle portion of an empty PRACH resource, and a third type having an SR message payload at the end of the SEQ.

Example 7 includes the apparatus of example 1, wherein the one or more processors and memory are further configured to include in the SR message a medium access control (MAC) header, a SR, a short BSR structure format, a long BSR structure format, and the C-RNTI.

Example 8 includes the apparatus of example 1, wherein the one or more processors and memory are further configured to generate the PRACH preamble index and the SR message according to a single-carrier frequency division multiple access (SC-FDMA) operation or an orthogonal frequency-division multiple access (OFDMA) operation.

Example 9 includes the apparatus of example 1, wherein the one or more processors and memory are further configured to: process a random access response (RAR) containing the C-RNTI that is received from the eNB to resolve the contention based SR; and use the RAR to explicitly acquire a SR decoding status, wherein the SR message is determined to be decoded by the eNB successfully when the UE detects the C-RNTI in the RAR.

Example 10 includes the apparatus of example 1, wherein the one or more processors and memory are further configured to multiplex the PRACH preamble index together with a SR message in time division multiplexing or frequency division multiplexing.

Example 11 includes the apparatus of example 1, wherein the one or more processors and memory are further configured to process, for transmission to the eNB, the PRACH preamble in the subframe #(n) and the SR message in a subsequent subframe of the subframe #(n).

Example 12 includes the apparatus of example 1, wherein the one or more processors and memory are further configured to include a sequence ID in the SR message for the PRACH transmission.

Example 13 includes the apparatus of example 1, wherein the one or more processors and memory are further configured to configure the SR message according to a short BSR structure format or a long BSR structure format.

Example 14 includes the apparatus of example 1, wherein the one or more processors and memory are further configured to link the SR message with the PRACH preamble index.

Example 15 includes the apparatus of example 1, wherein the one or more processors and memory are further configured to process, for re-transmission to the eNB, the SR message at next PRACH transmission subframe if the UE is not scheduled within a SR time window.

Example 16 includes the apparatus of example 1, wherein the one or more processors and memory are further configured to process, for implicitly transmitting to the eNB, the BSR in the PRACH preamble index.

Example 17 includes the apparatus of example 1, wherein the one or more processors and memory are further configured to generate the PRACH preamble index according to a buffer size index (BSI) or a scramble sequence.

Example 18 includes the apparatus of example 1, wherein the apparatus includes at least one of an antenna, a touch sensitive display screen, a speaker, a microphone, a graphics processor, an application processor, internal memory, a non-volatile memory port, and combinations thereof.

Example 19 includes an apparatus of an eNodeB operable to decrease latency for contention based scheduling request (SR) with a user equipment (UE), the apparatus comprising one or more processors and memory configured to: process a physical random access channel (PRACH) transmission, received from the UE, having a selected PRACH preamble index multiplexed with a scheduling request (SR) message containing a cell radio network temporary identifier (C-RNTI) and a buffer status report (BSR) in a subframe #(n) of the PRACH transmission, wherein n is a subframe number, wherein the eNodeB is operable to schedule an SR time window; and process, for transmission to the UE, a random access response (RAR) containing the C-RNTI to resolve the contention based SR.

Example 20 includes the apparatus of example 19, further configured to process the PRACH PREAMBLE index, received from the UE, multiplexed with the SR message for the PRACH transmission in a subframe #(n+k), wherein k is a positive integer, wherein k is a signal duration by a master information block (MIB), a system information block (SIB), or a UE-specific dedicated RRC signalling.

Example 21 includes the apparatus of example 19, further configured to process the SR message, received from the UE, in a reserved PRACH resource of the PRACH transmission.

Example 22 includes the apparatus of example 19, further configured to indicate a location of a PRACH resource of the PRACH transmission using a higher layer signal having a message offset indicator for the PRACH PREAMBLE index multiplexed with the SR message for the PRACH transmission.

Example 23 includes the apparatus of example 19, further configured to configure the PRACH transmission in inconsecutive subframes within a single frame for allowing the UE to transmit the PRACH preamble index in the subframe #(n) and the SR message in a subsequent subframe of the subframe #(n).

Example 24 includes the apparatus of example 19, further configured to configure the PRACH transmission in consecutive subframes within a single frame for allowing the UE to transmit the PRACH preamble index in the subframe #(n) and the SR message in a subsequent subframe of the subframe #(n).

Example 25 includes the apparatus of example 19, further configured to process, for transmission to the UE, a random access response (RAR) containing the C-RNTI to resolve the contention based SR to allow the UE to use the RAR to explicitly acquire a SR decoding status.

Example 26 includes the apparatus of example 19, further configured to detect the PRACH preamble index and a frequency domain channel according to the PRACH transmission and decode the C-RNTI and decode the BSR.

Example 27 includes the apparatus of example 19, further configured to detect preamble index and frequency domain channel based on PRACH signal, then decode C-RNTI from data part, finally decode the BSR or buffer size index (BSI) based on preamble index and the decoded C-RNTI.

Example 28 includes the apparatus of example 19, further configured to identify a linkage between the PRACH transmission and the SR message using a sequence ID in the SR message.

Example 29 includes the apparatus of example 19, further configured to process a retransmission of the SR message, received from the UE, at next PRACH transmission subframe if the UE is not scheduled within a SR time window.

Example 30 apparatus of a user equipment (UE), the UE configured to decrease latency for contention based scheduling request (SR), the apparatus comprising one or more processors and memory configured to: calculate a scrambled cyclic redundancy code (CRC) sequence according to a cell radio network temporary identifier (C-RNTI), a cell identification (ID), and a subframe #(n) for a physical random access channel (PRACH) transmission, wherein n is a subframe number; determine a current buffer size and a buffer size index (BSI); calculate a PRACH preamble index using the BSI and the scrambled CRC sequence for generating a scheduling request (SR) message; and transmitting a PRACH signal having the SR message.

Example 31 includes the apparatus of example 30, wherein the one or more processors and memory are further configured to calculate a K PRACH preamble index according to a buffer status report (BSR), a cell radio network temporary identifier (C-RNTI), a cell identification (ID), and a subframe #(n) for generating a scheduling request (SR) message, wherein K is a positive integer.

Example 32 includes an apparatus of a user equipment (UE), the UE configured to decrease latency for contention based scheduling request (SR), the apparatus comprising one or more processors and memory configured to: select a physical random access channel (PRACH) preamble index for a PRACH transmission; multiplex the PRACH preamble index together with an SR message containing a cell radio network temporary identifier (C-RNTI) and a buffer status report (BSR) for the PRACH transmission; and process, for transmission, to an enhanced node B (eNB), the PRACH preamble index multiplexed with the SR message in a subframe #(n) of the PRACH transmission, wherein n is a subframe number.

Example 33 includes the apparatus of example 32, wherein the one or more processors and memory are further configured to process, for transmission to the eNB, the PRACH PREAMBLE index multiplexed with the SR message for the PRACH transmission in a subframe #(n+k), wherein k is a positive integer, wherein k is a signal duration by a master information block (MIB), a system information block (SIB), or a UE-specific dedicated RRC signalling.

Example 34 includes the apparatus of examples 32 or 33, wherein the one or more processors and memory are further configured to process, for transmission to the eNB, the SR message in a reserved PRACH resource of the PRACH transmission.

Example 35 includes the apparatus of example 32, wherein the one or more processors and memory are further configured to map the PRACH preamble index and the SR message at a same resource block (RB) as the PRACH transmission in a time division.

Example 36 includes the apparatus of examples 32 or 35, wherein the one or a processors and memory are further configured to map the SR message to a reserved PRACH resource of the PRACH transmission in a time domain division.

Example 37 includes the apparatus of example 36, wherein the SR message is mapped to the reserved PRACH resource of the PRACH according to a first type with a SR message payload has no offset following a PRACH baseband sequence (SEQ), a second type having an SR message payload in a middle portion of an empty PRACH resource, and a third type having an SR message payload at the end of the SEQ.

Example 38 includes the apparatus of example 32, wherein the one or more processors and memory are further configured to include in the SR message a medium access control (MAC) header, a SR, a short BSR structure format, a long BSR structure format, and the C-RNTI.

Example 39 includes the apparatus of examples 32 or 38, wherein the one or more processors and memory are further configured to generate the PRACH preamble index and the SR message according to a single-carrier frequency division multiple access (SC-FDMA) operation or an orthogonal frequency-division multiple access (OFDMA) operation.

Example 40 includes the apparatus of example 32, wherein the one or more processors and memory are further configured to: process a random access response (RAR) containing the C-RNTI that is received from the eNB to resolve the contention based SR; and use the RAR to explicitly acquire a SR decoding status, wherein the SR message is determined to be decoded by the eNB successfully when the UE detects the C-RNTI in the RAR.

Example 41 includes the apparatus of examples 32 or 40, wherein the one or more processors and memory are further configured to multiplex the PRACH preamble index together with a SR message in time division multiplexing or frequency division multiplexing.

Example 42 includes the apparatus of example 32, wherein the one or more processors and memory are further configured to process, for transmission to the eNB, the PRACH preamble in the subframe #(n) and the SR message in a subsequent subframe of the subframe #(n).

Example 43 includes the apparatus of examples 32 or 42, wherein the one or more processors and memory are further configured to include a sequence ID in the SR message for the PRACH transmission.

Example 44 includes the apparatus of example 32, wherein the one or more processors and memory are further configured to configure the SR message according to a short BSR structure format or a long BSR structure format.

Example 45 includes the apparatus of examples 32 or 44, wherein the one or more processors and memory are further configured to link the SR message with the PRACH preamble index.

Example 46 includes the apparatus of example 32, wherein the one or more processors and memory are further configured to process, for re-transmission to the eNB, the SR message at next PRACH transmission subframe if the UE is not scheduled within a SR time window.

Example 47 includes the apparatus of examples 32 or 46, wherein the one or more processors and memory are further configured to process, for implicitly transmitting to the eNB, the BSR in the PRACH preamble index.

Example 48 includes the apparatus of example 32, wherein the one or more processors and memory are further configured to generate the PRACH preamble index according to a buffer size index (BSI) or a scramble sequence.

Example 49 includes the apparatus of example 32 or 48, wherein the apparatus includes at least one of an antenna, a touch sensitive display screen, a speaker, a microphone, a graphics processor, an application processor, internal memory, a non-volatile memory port, and combinations thereof.

Example 50 includes an apparatus of an eNodeB operable to decrease latency for contention based scheduling request (SR) with a user equipment (UE), the apparatus comprising one or more processors and memory configured to: process a physical random access channel (PRACH) transmission, received from the UE, having a selected PRACH preamble index multiplexed with a scheduling request (SR) message containing a cell radio network temporary identifier (C-RNTI) and a buffer status report (BSR) in a subframe #(n) of the PRACH transmission, wherein n is a subframe number, wherein the eNodeB is operable to schedule an SR time window; and process, for transmission to the UE, a random access response (RAR) containing the C-RNTI to resolve the contention based SR.

Example 51 includes the apparatus of example 50, further configured to process the PRACH PREAMBLE index, received from the UE, multiplexed with the SR message for the PRACH transmission in a subframe #(n+k), wherein k is a positive integer, wherein k is a signal duration by a master information block (MIB), a system information block (SIB), or a UE-specific dedicated RRC signalling.

Example 52 includes the apparatus of examples 50 or 51, further configured to process the SR message, received from the UE, in a reserved PRACH resource of the PRACH transmission.

Example 53 includes the apparatus of example 50, further configured to indicate a location of a PRACH resource of the PRACH transmission using a higher layer signal having a message offset indicator for the PRACH PREAMBLE index multiplexed with the SR message for the PRACH transmission.

Example 54 includes the apparatus of examples 50 or 53, further configured to configure the PRACH transmission in inconsecutive subframes within a single frame for allowing the UE to transmit the PRACH preamble index in the subframe #(n) and the SR message in a subsequent subframe of the subframe #(n).

Example 55 includes the apparatus of example 50, further configured to configure the PRACH transmission in consecutive subframes within a single frame for allowing the UE to transmit the PRACH preamble index in the subframe #(n) and the SR message in a subsequent subframe of the subframe #(n).

Example 56 includes the apparatus of examples 50 or 55, further configured to process, for transmission to the UE, a random access response (RAR) containing the C-RNTI to resolve the contention based SR to allow the UE to use the RAR to explicitly acquire a SR decoding status.

Example 57 includes the apparatus of example 50, further configured to detect the PRACH preamble index and a frequency domain channel according to the PRACH transmission and decode the C-RNTI and decode the BSR.

Example 58 includes the apparatus of examples 50 or 57, further configured to detect preamble index and frequency domain channel based on PRACH signal, then decode C-RNTI from data part, finally decode the BSR or buffer size index (BSI) based on preamble index and the decoded C-RNTI.

Example 59 includes the apparatus of example 50, further configured to identify a linkage between the PRACH transmission and the SR message using a sequence ID in the SR message.

Example 60 includes the apparatus of examples 50 or 59, further configured to process a retransmission of the SR message, received from the UE, at next PRACH transmission subframe if the UE is not scheduled within a SR time window.

Example 61 includes an apparatus of a user equipment (UE), the UE configured to decrease latency for contention based scheduling request (SR), the apparatus comprising one or more processors and memory configured to: calculate a scrambled cyclic redundancy code (CRC) sequence according to a cell radio network temporary identifier (C-RNTI), a cell identification (ID), and a subframe #(n) for a physical random access channel (PRACH) transmission, wherein n is a subframe number; determine a current buffer size and a buffer size index (BSI); calculate a PRACH preamble index using the BSI and the scrambled CRC sequence for generating a scheduling request (SR) message; and process, for transmission to an enodeB, a PRACH signal having the SR message.

Example 62 includes the apparatus of example 61, wherein the one or more processors and memory are further configured to calculate a K PRACH preamble index according to a buffer status report (BSR), a cell radio network temporary identifier (C-RNTI), a cell identification (ID), and a subframe #(n) for generating a scheduling request (SR) message, wherein K is a positive integer.

Example 63 includes n apparatus of a user equipment (UE), the UE configured to decrease latency for contention based scheduling request (SR), the apparatus comprising one or more processors and memory configured to: select a physical random access channel (PRACH) preamble index for a PRACH transmission; multiplex the PRACH preamble index together with an SR message containing a cell radio network temporary identifier (C-RNTI) and a buffer status report (BSR) for the PRACH transmission; and process, for transmission, to an enhanced node B (eNB), the PRACH preamble index multiplexed with the SR message in a subframe #(n) of the PRACH transmission, wherein n is a subframe number.

Example 64 includes the apparatus of example 63, wherein the one or more processors and memory are further configured to: process, for transmission to the eNB, the PRACH PREAMBLE index multiplexed with the SR message for the PRACH transmission in a subframe #(n+k), wherein k is a positive integer, wherein k is a signal duration by a master information block (MIB), a system information block (SIB), or a UE-specific dedicated RRC signalling; process, for transmission to the eNB, the SR message in a reserved PRACH resource of the PRACH transmission; configured to map the PRACH preamble index and the SR message at a same resource block (RB) as the PRACH transmission in a time division; or configured to map the SR message to a reserved PRACH resource of the PRACH transmission in a time domain division.

Example 65 includes the apparatus of examples 63 or 64, wherein the SR message is mapped to the reserved PRACH resource of the PRACH according to a first type with a SR message payload has no offset following a PRACH baseband sequence (SEQ), a second type having an SR message payload in a middle portion of an empty PRACH resource, and a third type having an SR message payload at the end of the SEQ.

In Example 66, the subject matter of Example 63 or any of the Examples described herein may further include, wherein the one or more processors and memory are further configured to: include in the SR message a medium access control (MAC) header, a SR, a short BSR structure format, a long BSR structure format, and the C-RNTI; generate the PRACH preamble index and the SR message according to a single-carrier frequency division multiple access (SC-FDMA) operation or an orthogonal frequency-division multiple access (OFDMA) operation; process a random access response (RAR) containing the C-RNTI that is received from the eNB to resolve the contention based SR; use the RAR to explicitly acquire a SR decoding status, wherein the SR message is determined to be decoded by the eNB successfully when the UE detects the C-RNTI in the RAR; or multiplex the PRACH preamble index together with a SR message in time division multiplexing or frequency division multiplexing.

In Example 67, the subject matter of Example 63 or any of the Examples described herein may further include, wherein the one or more processors and memory are further configured to: process, for transmission to the eNB, the PRACH preamble in the subframe #(n) and the SR message in a subsequent subframe of the subframe #(n); include a sequence ID in the SR message for the PRACH transmission; configure the SR message according to a short BSR structure format or a long BSR structure format; or link the SR message with the PRACH preamble index.

In Example 68, the subject matter of Example 63 or any of the Examples described herein may further include, wherein the one or more processors and memory are further configured to: process, for re-transmission to the eNB, the SR message at next PRACH transmission subframe if the UE is not scheduled within a SR time window; process, for implicitly transmitting to the eNB, the BSR in the PRACH preamble index; generate the PRACH preamble index according to a buffer size index (BSI) or a scramble sequence; or generate the PRACH preamble index according to a buffer size index (BSI) or a scramble sequence.

In Example 69, the subject matter of Example 63 or any of the Examples described herein may further include, wherein the apparatus includes at least one of an antenna, a touch sensitive display screen, a speaker, a microphone, a graphics processor, an application processor, internal memory, a non-volatile memory port, and combinations thereof.

Example 70 includes an apparatus of an eNodeB operable to decrease latency for contention based scheduling request (SR) with a user equipment (UE), the apparatus comprising one or more processors and memory configured to: process a physical random access channel (PRACH) transmission, received from the UE, having a selected PRACH preamble index multiplexed with a scheduling request (SR) message containing a cell radio network temporary identifier (C-RNTI) and a buffer status report (BSR) in a subframe #(n) of the PRACH transmission, wherein n is a subframe number, wherein the eNodeB is operable to schedule an SR time window; and process, for transmission to the UE, a random access response (RAR) containing the C-RNTI to resolve the contention based SR.

Example 71 includes the apparatus of any of the examples 70, further configured to process the PRACH PREAMBLE index, received from the UE, multiplexed with the SR message for the PRACH transmission in a subframe #(n+k), wherein k is a positive integer, wherein k is a signal duration by a master information block (MIB), a system information block (SIB), or a UE-specific dedicated RRC signalling.

Example 72 includes the apparatus of any of the examples 70 or 71, further configured to process the SR message, received from the UE, in a reserved PRACH resource of the PRACH transmission.

In Example 73, the subject matter of Example 70 or any of the Examples described herein may further include, further configured to: indicate a location of a PRACH resource of the PRACH transmission using a higher layer signal having a message offset indicator for the PRACH PREAMBLE index multiplexed with the SR message for the PRACH transmission; configure the PRACH transmission in inconsecutive subframes within a single frame for allowing the UE to transmit the PRACH preamble index in the subframe #(n) and the SR message in a subsequent subframe of the subframe #(n); or configure the PRACH transmission in consecutive subframes within a single frame for allowing the UE to transmit the PRACH preamble index in the subframe #(n) and the SR message in a subsequent subframe of the subframe #(n).

In Example 74, the subject matter of Example 70 or any of the Examples described herein may further include, further configured to: process, for transmission to the UE, a random access response (RAR) containing the C-RNTI to resolve the contention based SR to allow the UE to use the RAR to explicitly acquire a SR decoding status; detect the PRACH preamble index and a frequency domain channel according to the PRACH transmission and decode the C-RNTI and decode the BSR; detect preamble index and frequency domain channel based on PRACH signal, then decode C-RNTI from data part, finally decode the BSR or buffer size index (BSI) based on preamble index and the decoded C-RNTI; or identify a linkage between the PRACH transmission and the SR message using a sequence ID in the SR message.

In Example 75, the subject matter of Example 70 or any of the Examples described herein may further include, further configured to process a retransmission of the SR message, received from the UE, at next PRACH transmission subframe if the UE is not scheduled within a SR time window.

In Example 76, the subject matter of Example 70 or any of the Examples described herein may further include decreasing latency for contention based scheduling request (SR) with a user equipment (UE), the device comprising: means for receiving, from the UE, a physical random access channel (PRACH) transmission having a selected PRACH preamble index multiplexed with a scheduling request (SR) message containing a cell radio network temporary identifier (C-RNTI) and a buffer status report (BSR) in a subframe #(n) of the PRACH transmission, wherein n is a subframe number, wherein the eNodeB is operable to schedule an SR time window; and means for sending to the UE a random access response (RAR) containing the C-RNTI to resolve the contention based SR.

Example 77 includes a device for decreasing latency for contention based scheduling request (SR), the device comprising: means for calculating a scrambled cyclic redundancy code (CRC) sequence according to a cell radio network temporary identifier (C-RNTI), a cell identification (ID), and a subframe #(n) for a physical random access channel (PRACH) transmission, wherein n is a subframe number; means for determining a current buffer size and a buffer size index (BSI); means for calculating a PRACH preamble index using the BSI and the scrambled CRC sequence for generating a scheduling request (SR) message; and means for transmitting a PRACH signal having the SR message.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology.

One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE), the UE configured to decrease latency for contention based scheduling request (SR), the apparatus comprising one or more processors and memory configured to:
   select a physical random access channel (PRACH) preamble index for a PRACH transmission, wherein the PRACH preamble index is generated according to a buffer size index (BSI);
   multiplex the PRACH preamble index together with an SR message containing a cell radio network temporary identifier (C-RNTI) and a buffer status report (BSR) for the PRACH transmission; and
   process, for transmission, to an enhanced node B (eNB), the PRACH preamble index multiplexed with the SR message in a subframe #(n) of the PRACH transmission, wherein n is a subframe number.

2. The apparatus of claim 1, wherein the one or more processors and memory are further configured to process, for transmission to the eNB, the PRACH PREAMBLE index multiplexed with the SR message for the PRACH transmission in a subframe #(n+k), wherein k is a positive integer, wherein k is a signal duration by a master information block (MIB), a system information block (SIB), or a UE-specific dedicated RRC signalling.

3. The apparatus of claim 1, wherein the one or more processors and memory are further configured to process, for transmission to the eNB, the SR message in a reserved PRACH resource of the PRACH transmission.

4. The apparatus of claim 1, wherein the one or more processors and memory are further configured to map the PRACH preamble index and the SR message at a same resource block (RB) as the PRACH transmission in a time division.

5. The apparatus of claim 1, wherein the one or a processors and memory are further configured to map the SR message to a reserved PRACH resource of the PRACH transmission in a time domain division.

6. The apparatus of claim 5, wherein the SR message is mapped to the reserved PRACH resource of the PRACH according to a first type with a SR message payload has no offset following a PRACH baseband sequence (SEQ), a second type having an SR message payload in a middle portion of an empty PRACH resource, and a third type having an SR message payload at the end of the SEQ.

7. The apparatus of claim 1, wherein the one or more processors and memory are further configured to include in the SR message a medium access control (MAC) header, a SR, a short BSR structure format, a long BSR structure format, and the C-RNTI.

8. The apparatus of claim 1, wherein the one or more processors and memory are further configured to generate the PRACH preamble index and the SR message according to a single-carrier frequency division multiple access (SC-FDMA) operation or an orthogonal frequency-division multiple access (OFDMA) operation.

9. The apparatus of claim 1, wherein the one or more processors and memory are further configured to:
process a random access response (RAR) containing the C-RNTI that is received from the eNB to resolve the contention based SR; and
use the RAR to explicitly acquire a SR decoding status, wherein the SR message is determined to be decoded by the eNB successfully when the UE detects the C-RNTI in the RAR.

10. The apparatus of claim 1, wherein the one or more processors and memory are further configured to multiplex the PRACH preamble index together with a SR message in time division multiplexing or frequency division multiplexing.

11. The apparatus of claim 1, wherein the one or more processors and memory are further configured to process, for transmission to the eNB, the PRACH preamble in the subframe #(n) and the SR message in a subsequent subframe of the subframe #(n).

12. The apparatus of claim 1, wherein the one or more processors and memory are further configured to:
include a sequence ID in the SR message for the PRACH transmission; or
link the SR message with the PRACH preamble index.

13. The apparatus of claim 1, wherein the one or more processors and memory are further configured to configure the SR message according to a short BSR structure format or a long BSR structure format.

14. The apparatus of claim 1, wherein the one or more processors and memory are further configured to process, for re-transmission to the eNB, the SR message at next PRACH transmission subframe if the UE is not scheduled within a SR time window.

15. The apparatus of claim 1, wherein the one or more processors and memory are further configured to process, for implicitly transmitting to the eNB, the BSR in the PRACH preamble index.

16. The apparatus of claim 1, wherein the one or more processors and memory are further configured to generate the PRACH preamble index according to a scramble sequence.

17. The apparatus of claim 1, wherein the apparatus includes at least one of an antenna, a touch sensitive display screen, a speaker, a microphone, a graphics processor, an application processor, internal memory, a non-volatile memory port, and combinations thereof.

18. An apparatus of an eNodeB operable to decrease latency for contention based scheduling request (SR) with a user equipment (UE), the apparatus comprising one or more processors and memory configured to:
process a physical random access channel (PRACH) transmission, received from the UE, having a selected PRACH preamble index multiplexed with a scheduling request (SR) message containing a cell radio network temporary identifier (C-RNTI) and a buffer status report (BSR) in a subframe #(n) of the PRACH transmission, wherein n is a subframe number, wherein the eNodeB is operable to schedule an SR time window;
decode the BSR and a buffer size index (BSI) based on the selected PRACH preamble index and the C-RNTI; and
process, for transmission to the UE, a random access response (RAR) containing the C-RNTI to resolve the contention based SR.

19. The apparatus of claim 15, further configured to process the PRACH PREAMBLE index, received from the UE, multiplexed with the SR message for the PRACH transmission in a subframe #(n+k), wherein k is a positive integer, wherein k is a signal duration by a master information block (MIB), a system information block (SIB), or a UE-specific dedicated RRC signaling.

20. The apparatus of claim 18, further configured to process the SR message, received from the UE, in a reserved PRACH resource of the PRACH transmission.

21. The apparatus of claim 18, further configured to indicate a location of a PRACH resource of the PRACH transmission using a higher layer signal having a message offset indicator for the PRACH PREAMBLE index multiplexed with the SR message for the PRACH transmission.

22. The apparatus of claim 18, further configured to configure the PRACH transmission in inconsecutive subframes within a single frame for allowing the UE to transmit the PRACH preamble index in the subframe #(n) and the SR message in a subsequent subframe of the subframe #(n).

23. The apparatus of claim 18, further configured to configure the PRACH transmission in consecutive subframes within a single frame for allowing the UE to transmit the PRACH preamble index in the subframe #(n) and the SR message in a subsequent subframe of the subframe #(n).

24. The apparatus of claim 18, further configured to process, for transmission to the UE, a random access response (RAR) containing the C-RNTI to resolve the contention based SR to allow the UE to use the RAR to explicitly acquire a SR decoding status.

25. The apparatus of claim 18, further configured to detect the PRACH preamble index and a frequency domain channel according to the PRACH transmission and decode the C-RNTI and decode the BSR.

26. The apparatus of claim 18, further configured to detect preamble index and frequency domain channel based on PRACH signal, and decode C-RNTI from data part.

27. The apparatus of claim 18, further configured to identify a linkage between the PRACH transmission and the SR message using a sequence ID in the SR message.

28. The apparatus of claim 18, further configured to process a retransmission of the SR message, received from the UE, at next PRACH transmission subframe if the UE is not scheduled within a SR time window.

29. An apparatus of a user equipment (UE), the UE configured to decrease latency for contention based scheduling request (SR), the apparatus comprising one or more processors and memory configured to:
calculate a scrambled cyclic redundancy code (CRC) sequence according to a cell radio network temporary identifier (C-RNTI), a cell identification (ID), and a subframe #(n) for a physical random access channel (PRACH) transmission, wherein n is a subframe number;
determine a current buffer size and a buffer size index (BSI);
calculate a PRACH preamble index using the BSI and the scrambled CRC sequence for generating a scheduling request (SR) message; and
process, for transmission to an enodeB, a PRACH signal having the SR message.

30. The apparatus of claim 29, wherein the one or more processors and memory are further configured to calculate a K PRACH preamble index according to a buffer status report (BSR), a cell radio network temporary identifier (C-RNTI), a cell identification (ID), and a subframe #(n) for generating a scheduling request (SR) message, wherein K is a positive integer.

* * * * *